United States Patent [19]
Wakeland et al.

[11] Patent Number: 5,258,826
[45] Date of Patent: Nov. 2, 1993

[54] MULTIPLE EXTENDED MODE SUPPORTABLE MULTIMEDIA PALETTE AND MULTIMEDIA SYSTEM INCORPORATING SAME

[75] Inventors: Carl K. Wakeland, Bedford; Dale Chatham, Azle, both of Tex.

[73] Assignee: Tandy Corporation, Fort Worth, Tex.

[21] Appl. No.: 931,761

[22] Filed: Aug. 18, 1992

Related U.S. Application Data

[63] Continuation-in-part of Ser. No. 771,310, Oct. 2, 1991.

[51] Int. Cl.⁵ .............................................. H04N 11/06
[52] U.S. Cl. ...................................... 358/12; 358/21 R; 345/115
[58] Field of Search .................. 358/21 R, 13, 12, 30; 340/703, 721, 812

[56] References Cited

U.S. PATENT DOCUMENTS

| | | | |
|---|---|---|---|
| 4,672,427 | 6/1987 | Rzeszewski . | |
| 4,716,453 | 12/1987 | Pawelski . | |
| 4,847,677 | 7/1989 | Music et al. . | |
| 4,857,992 | 8/1989 | Richards . | |
| 4,868,764 | 9/1989 | Richards | 358/30 X |
| 4,962,428 | 10/1990 | Tong et al. | 358/188 |
| 5,027,212 | 6/1991 | Marlton et al. | 340/721 X |
| 5,150,109 | 9/1992 | Berry | 340/703 X |

Primary Examiner—Victor R. Kostak
Attorney, Agent, or Firm—David L. McCombs; Michael S. Bush

[57] ABSTRACT

A palette for converting video data encoded in multiple YUV and RGB formats into a configuration suitable for transmission to a display and a multimedia system incorporating the same. The palette selectively converts video data encoded into a five bit luminance component for each of four successive pixel elements, a first five bit chrominance component for the four successive pixel elements and a second five bit chrominance component for the four successive pixel elements into a eight bit red, green and blue components for the pixel elements, converts video data encoded in an eight bit luminance component for each of two successive pixel elements and first and second eight bit luminance components for the two successive pixel elements into eight bit red, green and blue components for the pixel element, converts video data encoded in four data bits for a pixel element into six bit red, green and blue components for the pixel element and converts video data encoded in multiple RGB mode, including 555, 565 and 888 modes, into eight bit red, green and blue components.

24 Claims, 16 Drawing Sheets

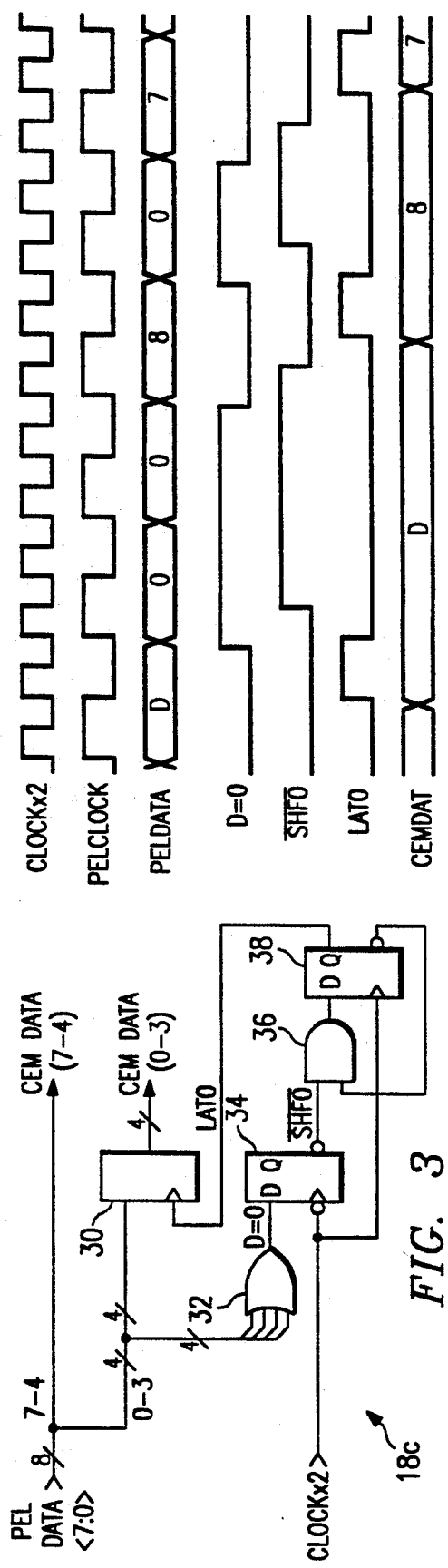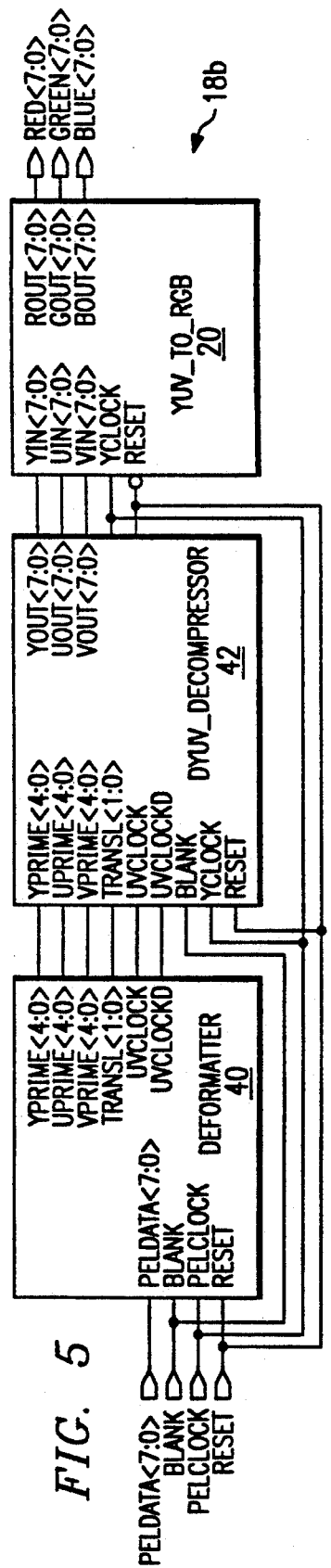

BYTE 1

| BIT POS | 7 | 6 | 5 | 4 | 3 | 2 | 1 | 0 |
|---|---|---|---|---|---|---|---|---|
| | TRANS CODE BIT 0 | U4 PEL #1-4 | U3 PEL #1-4 | Y4 PEL #1 | Y3 PEL #1 | Y2 PEL #1 | Y1 PEL #1 | Y0 PEL #1 |

BYTE 2

| BIT POS | 7 | 6 | 5 | 4 | 3 | 2 | 1 | 0 |
|---|---|---|---|---|---|---|---|---|
| | U2 PEL #1-4 | U1 PEL #1-4 | U0 PEL #1-4 | Y4 PEL #2 | Y3 PEL #2 | Y2 PEL #2 | Y1 PEL #2 | Y0 PEL #2 |

BYTE 3

| BIT POS | 7 | 6 | 5 | 4 | 3 | 2 | 1 | 0 |
|---|---|---|---|---|---|---|---|---|
| | TRANS CODE BIT 1 | V4 PEL #1-4 | V3 PEL #1-4 | Y4 PEL #3 | Y3 PEL #3 | Y2 PEL #3 | Y1 PEL #3 | Y0 PEL #3 |

BYTE 4

| BIT POS | 7 | 6 | 5 | 4 | 3 | 2 | 1 | 0 |
|---|---|---|---|---|---|---|---|---|
| | V2 PEL #1-4 | V1 PEL #1-4 | V0 PEL #1-4 | Y4 PEL #4 | Y3 PEL #4 | Y2 PEL #4 | Y1 PEL #4 | Y0 PEL #4 |

A = N
B = [N+(N-1)] ÷ 2
C = (N-1)

*=PIXEL TO BE INTERPOLATED

MULTIPLE EXTENDED MODE SUPPORTABLE MULTIMEDIA PALETTE AND MULTIMEDIA SYSTEM INCORPORATING SAME

CROSS REFERENCE TO RELATED APPLICATION

This application is a continuation-in-part of U.S. patent application Ser. No. 07/771,310 entitled "Method and Apparatus for Decoding Encoded Video Data", filed on Oct. 2, 1991, assigned to the assignee of the present application and hereby incorporated by reference as if reproduced in its entirety.

BACKGROUND OF THE INVENTION

1. Field of the Invention

This invention is related to multimedia systems and, more particularly, to a palette for supporting multiple extended modes of video data for display.

2. Description of Related Art

The capability of displaying full-color, 32-bit images on high-resolution monitors has, in recent years, become increasingly in demand, particularly in multimedia and scientific visualization applications. However, full-color, 32-bit images require enormous amounts of storage space which, in turn, increases the cost of such imaging systems considerably. For example, a single full-color, 32-bit image on a high resolution display can often require as much as 3-4 Mbytes of data. In contrast, a single gray-scale image typically requires 1 Mbytes of data and a single black-and-white image typically requires only 125 Kbytes of data. These storage requirements are particularly problematic in animated graphic and/or full motion video applications. Animated graphic applications require the storage and display of hundreds of screen images in sequence. Full-motion color video applications, on the other hand, requires the display of 30 frames, each demanding approximately 1 Mbyte of storage space, per second. Thus, one minute of full motion color video will require a storage capacity of almost 2 Gigabytes.

Even assuming that sufficient storage capacity is available, data transfer rates pose yet another obstacle to widespread use of full color video imaging systems. Most desktop computers fall well short of the 30 Mbps data transfer rate required for full-motion color video applications. For example, the hard disk drives commonly found in many desktop computers have data transfer rates of 1 to 2 MBps. Furthermore, the data buses most commonly associated with such computer systems also tend to transfer data at rates under 20 MBps. For example, the AT bus drive runs at 8 MBps.

The CD has long been viewed as the solution to the storage requirements for full-motion color video applications. CD-ROM drives, however, tend to transfer data at rates slower than hard disk drives. Thus, while the much larger storage space of the CD is capable of addressing one problem with full-motion color video applications, the relatively slow CD-ROM drive remains an obstacle.

The solution to these problems is the use of data compression to reduce the size of the data required to represent a graphic image. The basic component of an image is the pixel and most image compression techniques address the visual attributes (color and transparency) attached to each pixel of an image. Because images generally have regions of uniform color or pattern, most commonly in the background, it is possible to represent the visual attributes of these regions using much less data information than that required to separately represent each individual pixel in that region. For this reason, many image compression schemes such as those disclosed in U.S. Pat. Nos. 4,785,349 to Keith et al and 4,868,653 to Golin et al. are directed towards dividing an image into various regions for individually encoding the visual attributes of the regions. Other methods such as those disclosed in U.S. Pat. Nos. 4,953,196 to Ishikawa et al. and 5,300,377 to Lipmann et al. exploit the fact that certain components of the data information for an image are less important than the data information of other components of the image.

The demands on the multimedia system to support the display of various types of images varies from image to image. For example, the demands on the multimedia system needed to support animated graphic applications vary dramatically from that of full-motion color video. Accordingly, to increase the efficiency and versatility of multimedia systems to perform the many applications of which such system are capable, it has been desired to configure the multimedia system to readily support the display of images in multiple modes.

SUMMARY OF THE INVENTION

In one embodiment, the present invention is of a multimedia system comprised of a palette, VGA controller and display means interconnected by a system bus. The palette is configured to receive video data encoded in at least two modes from the VGA controller and includes means for converting each of the received modes of encoded video data into an RGB type video signal and an output for transmitting the converted RGB type video signals to the display means. In alternate aspects, the converting means within the palette may include means for converting video data encoded into a five bit luminance component for each of four successive pixel elements, a first five bit chrominance component for the four successive pixel elements and a second five bit chrominance component for the four successive pixel elements into eight bit red, green and blue components for the pixel elements, means for converting video data encoded in an eight bit luminance component for each of two successive pixel elements and first and second eight bit luminance components for the two successive pixel elements into eight bit red, green and blue components for the pixel element, means for converting video data encoded in four data bits for a pixel element into six bit red, green and blue components for the pixel element or a combination thereof. In another aspect, the converting means may further include means for converting data encoded in at least one compressed RGB mode into eight bit red, green and blue components.

In another embodiment, the present invention is of a palette for use in a multimedia system. The palette may include first and/or second decoder means for decoding video data encoded in first and second YUV modes, respectively, into YUV components, a YUV to RGB converter connected to receive the decoded YUV components output the first and second decoder means, respectively, and convert the components into eight bit red, green and blue components, direct color converter means for converting data encoded in at least one encoded RGB mode into 8 bit red, green and blue components, and a color repeat decoder having a color lookup RAM for converting video data encoded as a four bit color look-up table address into six bit red, green and blue components. Depending on its particular configuration, the palette would further include control means for propagating encoded video data input to the palette through the first decoder means and the YUV to RGB converter if the data is encoded in the first YUV mode, through the second decoder means and the YUV to RGB converter if the data is encoded in the second YUV mode, through the direct color converter if the input data is encoded in an encoded RGB mode and through the color repeat decoder if the data is encoded in four bits per pixel. In a further aspect of this embodiment of the invention, the encoded RGB modes which may be converted by the direct color converter include the 555, 565 and 888 modes.

BRIEF DESCRIPTION OF THE DRAWING

The present invention may be better understood, and its numerous objects, features and advantages will become apparent to those skilled in the art by reference to the accompanying drawings in which:

FIG. 2b is a block diagram of the circuitry controlling the multiple extended mode palette of FIG. 2a;

FIG. 2c is a block diagram of a YUV-16 decoder of the multiple extended mode palette of FIG. 2a;

FIG. 3 is a block diagram of a color repeat decoder of the multiple extended mode palette of FIG. 2a;

FIG. 4 is a timing diagram for the color repeat decoder of FIG. 3;

FIG. 5 is a block diagram of a delta YUV decoder of the multiple extended mode palette of FIG. 2a;

FIG. 20 is a schematic diagram of a YUV-to-RGB converter of the multiple extended mode palette of FIG. 2a;

DETAILED DESCRIPTION OF A PREFERRED EMBODIMENT

Figure 1:
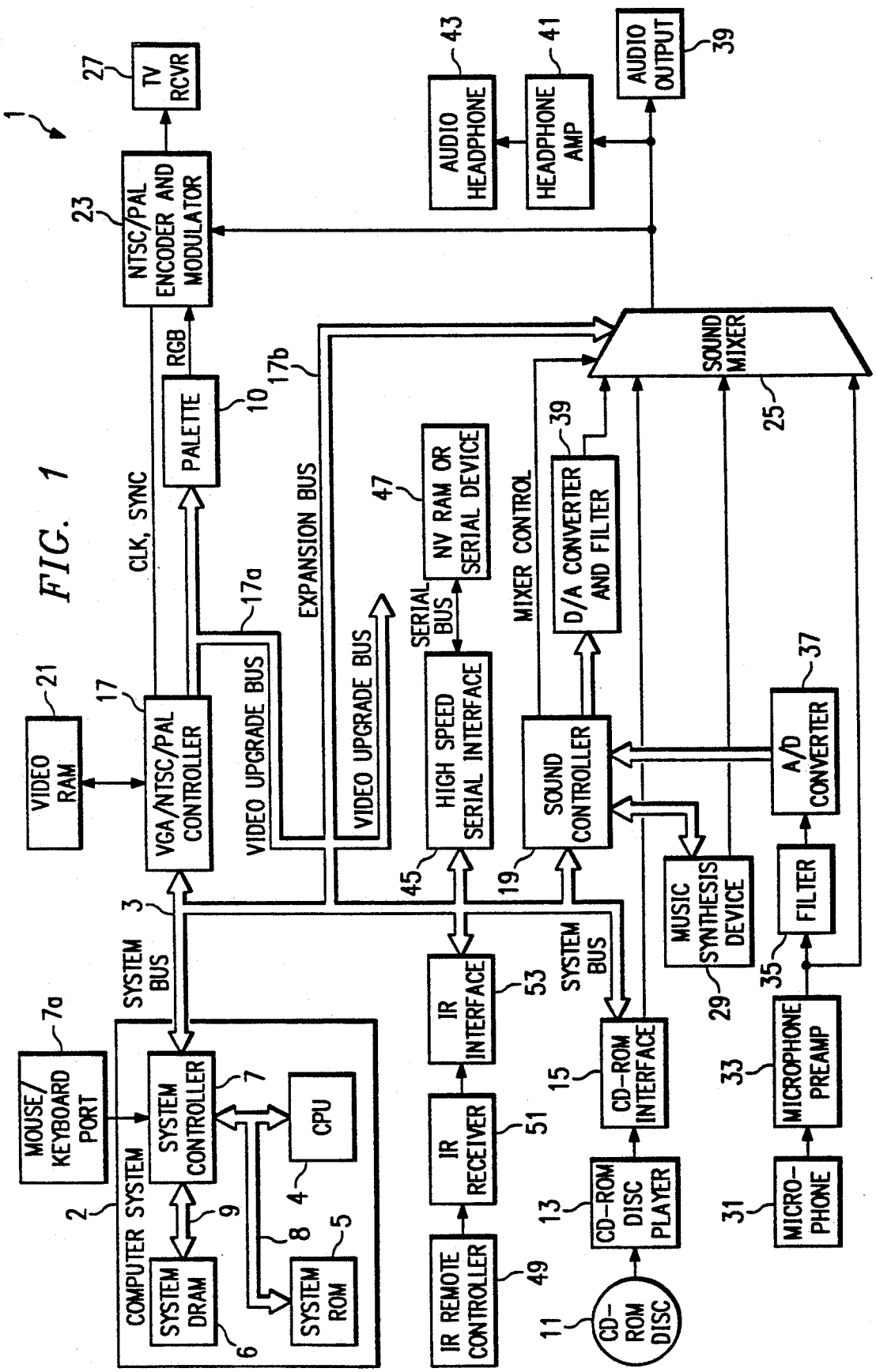
FIG. 1 is a block diagram of a multimedia system having a multiple extended mode palette constructed in accordance with the teachings of the present invention.

Referring first to FIG. 1, a multimedia system having a video color decoder constructed in accordance with the present invention shall now be described in greater detail. The multimedia system 1 is configured to receive audio and/or video signals from multiple sources and transmit the received signals to selected audio and/or video reproduction equipment associated with the multimedia system 1. The overall operation of the multimedia system 1 is controlled by a general purpose computer system 2 such as a desktop computer operably connected with the remainder of the multimedia system 1 by a system bus 3. In addition to managing the flow of data and control signals between the various components of the multimedia system 1, it is contemplated that the computer system 2 shall be capable of running software applications and, if desired, utilizing the video and/or sound components of the multimedia system 1 for display and/or audio generation purposes.

The computer system 2 includes a central processing unit (or "CPU") 4 such as an 80286 microprocessor, a system read only memory (or "ROM") unit 5, a system dynamic random access memory (or "DRAM") unit 6 for storing and a system controller 7. The CPU 4, the system ROM 5 and the system controller 7 are interconnected by address, data and control bus 8 for the transfer of address, data and control signals therebetween. Similarly, an address, data and control bus 9 interconnects the system DRAM unit 6 and the system controller 7 for the transfer of address, data and control signals therebetween. A mouse/keyboard port 7a operatively connected to the system controller 7 is provided for operator input of data or control signals via a mouse, computer keyboard or other input device. Finally, additional data transfer and/or data storage capability is provided by a non-volatile (or "NV") RAM or serial device 47 operatively connected to the system bus 3 via a high speed serial interface 45. For example, element 47 may be a NV RAM, thereby providing powered down storage capacity. Alternately, element 45 may be a printer, modem or other serial device commonly used in two way data transfers.

Data may be input the multimedia system 1 using a compact disc read only memory (or "CD-ROM") 11 having video, audio, text, computer software, and/or other data stored thereon. For example, in co-pending U.S. patent application Ser. No. 07/770,544 entitled "Method and Apparatus for Encoding Video Color Data Signals and Protocol for Encoding Same", assigned to the assignee of the present application and hereby incorporated by reference as if reproduced in its entirety, discloses full color video data signals digitally encoded in a format suitable for storage on a CD-ROM. The CD-ROM 11 is inserted in a CD-ROM disc player 13 which reads the digitally encoded data stored on the CD-ROM 11 and transmits the data to a CD-ROM interface 15. The CD-ROM interface 15 identifies the type of data read from the CD-ROM and transmits the data to an appropriate multimedia system component via the system bus 3. For example, video signals would most commonly be transmitted to a VGA/NTSC/PAL (or "VGA") controller 17, audio signals to a sound controller 19 and computer programs to the computer system 2, although, it is contemplated that, in certain applications, digitally encoded data would be transferred to the computer system 2 for processing and/or storage purposes before reaching its final destination. Also, certain audio signals identified by the CD-ROM interface 15 may be what is commonly referred to as "red book"0 audio signals and which are directly transferred to a sound mixer 25 via an audio connection between the CD-ROM interface 15 and the sound mixer 25.

Encoded video signals transferred to the VGA controller 17 are transferred to a video RAM 21 for storage prior to display. To display selected ones of the encoded video signals stored in the video RAM 21, the VGA controller 17 instructs the video RAM 21 to transmit the selected encoded digital video signals to a palette 10 via the VGA controller 17. In a manner described in much greater detail below, the palette 10 decodes the encoded digital video signals, converts the signals into red, green and blue (or "RGB") components, and then converts the RGB video signals into analog form. It is contemplated that the VGA controller 17 will be configured to drive the operation of the palette 10 in various modes, thereby enabling the multimedia system 1 to display high color content natural images, animation images as well as combinations of the two. Additionally, a video upgrade bus 17a is provided so that auxiliary boards (not shown) capable of driving the operation of the palette 10 in still other imaging modes may be installed in the multimedia system 1. It is further contemplated that the palette 10 will be configured to perform multiple modes of decoding, including compressed YUV and border encoding, thereby permitting the multimedia system 1 to produce an enhanced display of various types of video data, including full motion, animated and still images.

The analog RGB video signals are then transmitted to a NTSC/PAL encoder and modulator 23 which, under the control of the clock (or "CLK") and synchronizing (or "SYNC") signals from the VGA controller 17, modulates the received RGB video signals into a form suitable for display by the video display component of television receiver 27. Audio signals are transmitted to the audio generation component of the television receiver 27 by a sound mixer 25 which transmits audio signals to the NTSC/PAL encoder and modulator 23 which synchronizes the audio and video signals before transmission to the television receiver.

As previously discussed, the multimedia system 1 includes a sound controller 19 which, in conjunction with the system controller 7, controls the transmission of audio signals between various sources and destinations. In addition to those audio signal sources and destinations previously discussed, digital audio signals may also be generated by a music synthesis device 29 and transmitted directly to the sound controller 19 or by the computer system 2 and transmitted to the sound controller 19 via the system bus 3. Analog input audio signals such as live sounds may be detected by a microphone 31, transmitted to a microphone pre-amp 33 which amplifies the input audio signal, filtered by an anti-aliasing filter 35, digitized by an analog to digital converter 37 and transmitted to the sound controller 19, although, in an alternate embodiment of the invention, the output of the microphone pre-amp 33 may be transmitted directly to the sound mixer 25. The sound controller 19 transmits the digital audio signals received from the various sources and transmits the audio signals to a digital to audio converter 39 for conversion to analog and, in turn, to the sound mixer 25.

In addition to the multiple source originating, analog audio signals received from the digital to analog converter 39, the sound mixer 25 is connected to receive audio signals from the CD-ROM interface 15, the music synthesis device 29, the microphone pre-amp 33 and, if direct audio capability is installed on the expansion 17b to the system bus 17, from the expansion bus 17b as well. Under control signals generated by the sound controller 19, the sound mixer 25 will select the audio signal to be output and propagate the selected to an audio output 39 which may be, for example, a speaker system, or, via a headphone amp 41, to an audio headphone 43.

Operator control of the various components of the multimedia system 1 from a remote location is provided by a hand-held infra-red remote controller 49. Upon operator actuation, the infra-red remote controller 49 transmits a control signal capable of detection by a IR receiver 51 which also transmits the detected control signal to the system bus 3 via an IR interface 53.

Continuing to refer to FIG. 1, the VGA controller 17 transmits an 8 bit encoded video pixel element (or "PEL") data signal, a clock signal and a blank signal to the multiple extended mode palette 10. Depending upon the mode previously utilized to encode the transmitted PEL data, the multiple extended mode palette 10 will decode the PEL data in a selected one of various decoding techniques and convert the decoded PEL data into its 8 bit red, green, and blue components for output. The extended modes for which the multiple extended mode palette 10 may decode data are: (1) 16 bit YUV decoding; (2) 8 bit pixel compressed (or "delta") YUV decoding; (4) color repeat decoding; (5) 555 mode direct color decoding; (6) 565 direct color decoding; and (7) 888 direct color decoding. Additionally, the multiple extended mode palette 10 may also decode video data in "normal" mode by utilizing an 8×18 RAM 16 as a color look-up table (or "CLUT"), or operate in a "mix" mode which will selectively decode data in 555 or normal mode. "On the fly" switching between 555 and normal mode is also provided. Finally, it is contemplated that the multiple extended mode palette 10 will be further configured to decode video data encoded in various so-called "Sierra" type extended modes to be more fully described below.

Figure 2A:
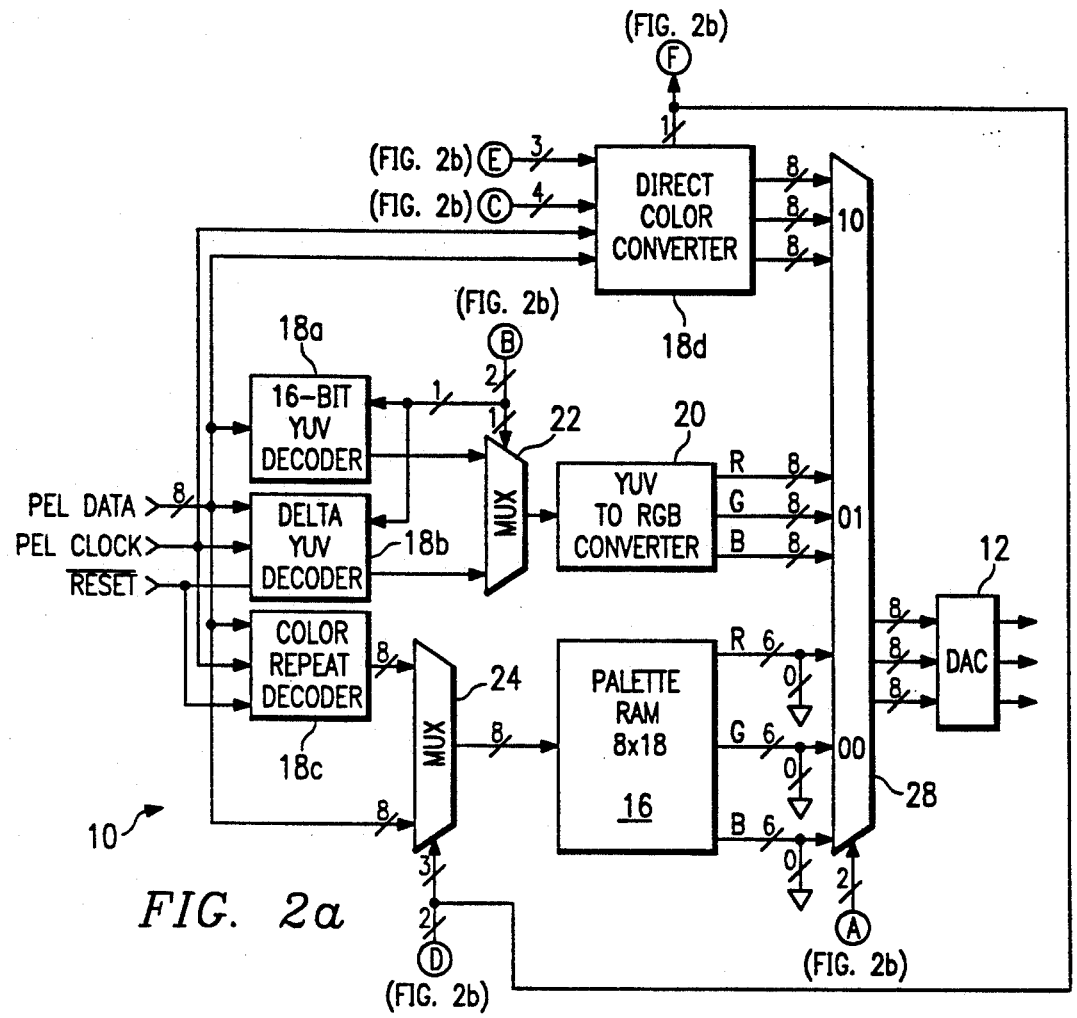
FIG. 2a is a block diagram of the multiple extended mode palette of FIG. 1.
Figure 2C:
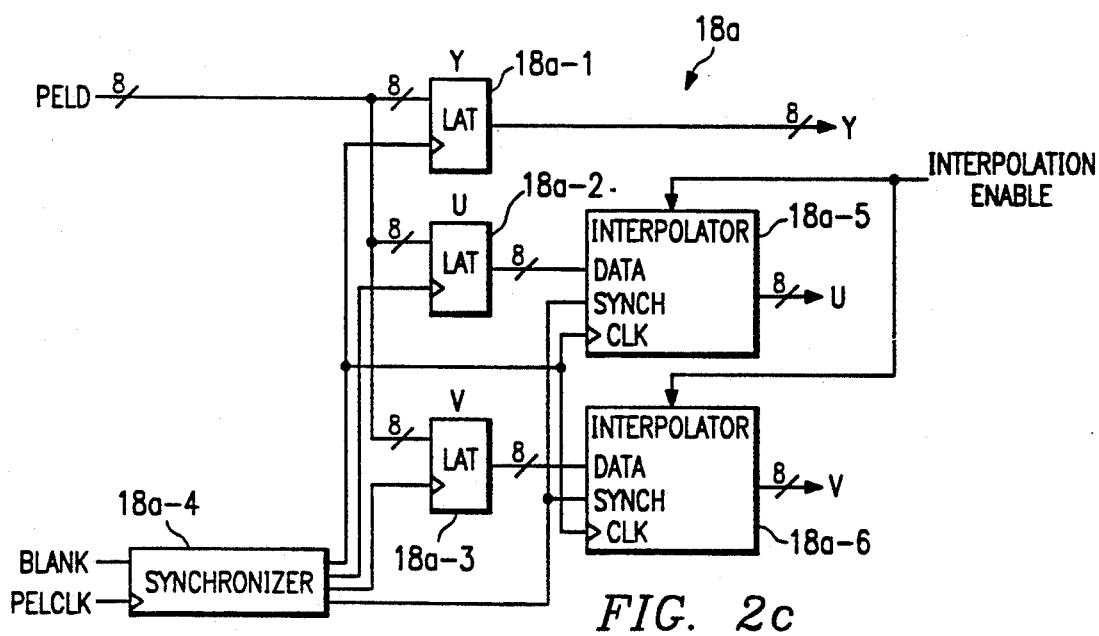
Figure 2B:
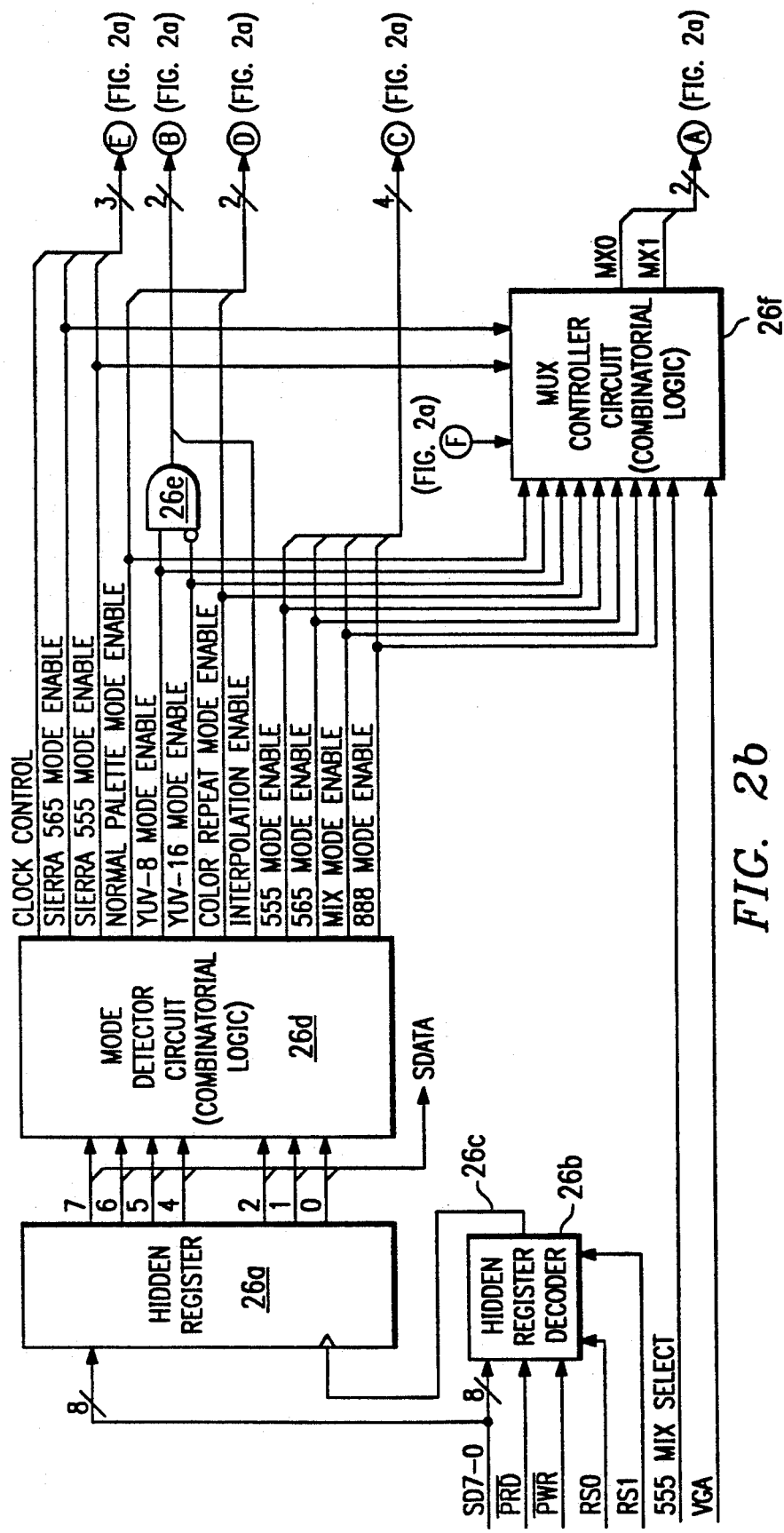

Referring now to FIGS. 2a–b, the operation of the multiple extended mode palette 10 will now be described in greater detail. As previously stated, the palette 10 is configured to be selectively operated in seven extended modes, the selection of which is controlled by the contents of an 8 bit "hidden" register 26a configured in accordance with Table I below:

TABLE I

| D7 | D6 | D5 | D4 |
|---|---|---|---|
| Extended Modes Enable | Extended Modes Control | Data Clock Control | Interpolation and Mix-Mode Control |
| D3 | D2 | D1 | D0 |
| Reserved | Extend Mode Bit 2 | Extended Mode Bit 1 | Extended Mode Bit 0 |

In addition to their above listed functions and, as is described in detail below, certain configurations of D7:0 will configure the multiple extended mode palette 10 to operate in various Sierra type extended modes instead. Generally speaking, the multiple extended mode palette 10 operates in one of the Sierra type extended modes when selected ones of D7:5 are set and the multiple extended mode palette 10 operates in various of the seven extended modes when selected ones of D4:0 are set.

Operation of the multiple extended mode palette 10, including the reading or writing of color palette RAM data thereto or therefrom, as well as the mode of operation thereof, is controlled by palette read signal PRD, palette write signal PWR and register select inputs RS0, RS1. To operate the multiple extended mode palette 10 in one of the aforementioned extended modes, a code corresponding to the desired extended mode is written to the hidden register 26a. To write to the hidden register, four successive reads from a hidden register decoder 26b at address 10 (RS0=0, RS1=1) should be performed. The hidden register decoder 26b then enables a write to the hidden register 26a via control line 26c and the following single read or write from SD7-0 will be written to the hidden register 26a. During a display operation in which encoded video signals configured in a mode corresponding to the mode written to the hidden register 26a are transmitted to the multiple extended mode palette 10 for decoding, conversion into analog RGB signals and transmission to a display, the contents of the hidden register 26a, in response to a control signal from the hidden register decoder 26b along control line 26c, are propagated to mode detector circuit 26d. Mode detector circuit 26d, which is a collection of combinatorial logic receives the contents of the hidden register 26a and outputs a enabling signal along a selected one of a series of outputs to enable the multiple extended mode palette 10 to operate in the desired extended mode.

If bit D7=0, the multiple extended mode palette 10 is to operate in "normal" mode, an industry standard BT476 compatible mode, irregardless of the remainder of the contents of the hidden register 26a. Accordingly, when bit D7=0, the mode detector 26d will drive the normal palette mode enable line high. Since, in normal mode, no decoding of the video data is necessary, the normal palette mode enable line instructs the multiplexer 24 to directly propagate each pixel element (or "PEL") of video data originating at the VGA controller 17 to the 8×18 palette RAM 16. Stored in the palette RAM 16 is a color look-up table (or "CLUT") which converts the PEL video data into a 6-bit red, green and blue form. Two lower significant bits are then added to each component to form 8 bit red, green and blue pixel data components which are directed to the 00 input of multiplexer 28.

If bit D7=1, the multiple extended mode palette 10 is to operate in an extended mode. If bits D6:0 are set to zero, the palette 10 is to operate in Sierra SC11483 compatible 555, a 32,768 color compressed RGB type encoded mode. The mode detector circuit 26d will drive the Sierra 555 mode enable high, thereby instructing the direct color converter 18d to operate in Sierra 555 mode. As Sierra 555 mode differs from the industry standard 555 mode only by minor modifications to the clocking of the conversion of an input pixel element comprised of 5-bit red, green and blue components to 8-bit red, green and blue components, the Sierra 555 mode need not be described in greater detail here.

With bit D7 set to 1, if the extended mode control bit, D6, is set to 0, the multiple extended mode palette 10 is enabled for operation in one of the aforementioned extended modes. If, however, D6 is set to 1 and D5:0 are set to zero, the multiple extended mode palette 10 is enabled for operation in Sierra SC11483 compatible 565, a 65,536 color compressed RGB mode. The mode detector circuit 26d will drive the Sierra 565 mode enable high, thereby instructing the direct color converter 18d to operate in Sierra 565 mode. As Sierra 565 mode differs from the industry standard 565 mode only by minor modifications to the clocking of the conversion of an input pixel element comprised of 5-bit red and blue components and a 6-bit green component into 8-bit red, green and blue components, the Sierra 565 mode need not be described in greater detail here.

Bit D5 controls the setting of a clock control line used by the direct color converter 18d to clock input pixel data in Sierra 555 and Sierra 565 modes. If bit D5=0, the clock control line is set for clocking mode 1 in which all 16 bits/pixel modes use both edges of the PEL CLOCK input, thereby permitting the direct color converter 18d to convert data in Sierra 555 mode. In clocking mode 1, the lower byte of the pixel is latched on the rising edge of PEL CLOCK and the upper byte of the pixel is latched on the falling edge of PEL CLOCK. If, however, bit D5=1, the clock control line is set for clocking mode 2 in which all 16 bits/pixel modes use a clock rate two times the analog output pixel rate, thereby permitting the direct color converter 18d to convert data in Sierra 565 mode. In clocking mode 2, each byte of the 16-bit pixel element is clocked in, one byte at a time, on the rising edge of the clock. All other extended modes latch pixel data on the rising edge of PEL CLOCK. Accordingly, when the contents of the hidden register indicates that the multiple extended mode palette 10 is to operate in an extended mode other than Sierra 555 or Sierra 565, bit D5 is ignored.

If bits D7:6 are set to 1, the multiple extended mode palette 10 will operate in an extended mode specified by bits D4:0. Addressing the extended modes controlled by bits D4:0 of the hidden register 26a, bit D4 controls the operation of the multiple extended mode palette 10 in both 555 and mix extended mode described below, as well as the use of interpolation in the YUV extended modes also described below, bit D3 is reserved for later use and bits D2:0 control the operation of the multiple extended mode palette 10 in its primary, i.e. non-Sierra, extended modes.

Hidden register bits D2:0, which, as previously stated, control the operation of the multiple extended mode palette 10 in its primary extended modes are defined as follows:

TABLE 2

| D2 | D1 | D0 | Function |
|---|---|---|---|
| 0 | 0 | 0 | 565, 65536 color mode |

TABLE 2-continued

| D2 | D1 | D0 | Function |
|----|----|----|----------|
|    |    |    | (SC11483 compatible) |
| 0  | 0  | 1  | 565, 65536 color mode |
| 0  | 1  | 0  | Border encoded 8-bit mode (color repeat decoding) |
| 0  | 1  | 1  | YUV mode, 16 bits/PEL (16-bit YUV) |
| 1  | 0  | 0  | Compressed YUV mode, 8 bits/PEL (delta YUV) |
| 1  | 0  | 1  | 888, 16777216 color mode |
| 1  | 1  | 0  | Reserved |
| 1  | 1  | 1  | ID register access (reading hidden register will show 0Ah as current revision |

If bits D2:0 is set to (0,0,0), the multiple extended mode palette 10 will again operate in the Sierra 565 mode. Accordingly, the mode detector circuit 26d will drive the Sierra 565 mode enable line high, thereby instructing the direct color converter 18d to operate in 565 mode. Additionally, when bits D2:0 are used to enable Sierra 565 mode, bit D5 should also be set to 1.

If D2:0 is set to (0,0,1), the multiple extended mode palette 10 is to operate in the industry standard 565 compressed RGB type encoded mode. Accordingly, the mode detector circuit 26d will drive the 565 mode enable line high, thereby instructing the direct color converter 18d to operate in 565 mode. In 565 mode, each pixel is represented by two bytes containing 5 bits of red and blue and 6 bits of green color intensity information configured in the following format:

TABLE 3

| ONE PIXEL | | | | | | | | | | | | | | | | |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | Field Bit Pos. |
| 4 | 3 | 2 | 1 | 0 | 5 | 4 | 3 | 2 | 1 | 0 | 4 | 3 | 2 | 1 | 0 | Color Bit Pos. |
| Red Level | | | | | Green Level | | | | | | Blue Level | | | | | |

The input sequence for each pixel is low byte first, followed by high byte. The first low byte will be taken on the first rising edge of PEL CLOCK occurring when BLANK has gone inactive. All subsequent bytes are clocked in on the rising edge of PEL CLOCK.

If D2:0 is set to (1,0,1), the multiple extended mode palette 10 is to operate in the industry standard 888 RGB type encoded mode. Accordingly, the mode detector circuit 26d propagates an 888 mode enable signal to the direct color converter 18d, thereby instructing the direct color converter 18d to support this industry standard 16,777,216 color mode. In 888 mode, each pixel is represented by three bytes, each containing 8 bits of red, blue and green color intensity information configured in the following format:

TABLE 4

| 7 | 6 | 5 | 4 | 3 | 2 | 1 | 0 |
|---|---|---|---|---|---|---|---|
| Byte 1 (Blue Data) | | | | | | | |
| B7 | B6 | B5 | B4 | B3 | B2 | B1 | B0 |
| BYTE 2 (GREEN DATA) | | | | | | | |
| G7 | G6 | G5 | G4 | G3 | G2 | G1 | G0 |
| BYTE 3 (RED DATA) | | | | | | | |
| R7 | R6 | R5 | R4 | R3 | R2 | R1 | R0 |

The input sequence for each pixel is low byte first, followed by middle byte, followed by high byte. The first low byte will be taken on the first rising edge of PEL CLOCK occurring when BLANK has gone inactive. All subsequent bytes are clocked in on the rising edge of PEL CLOCK.

If bits D(2:0)=(0,1,1), the multiple extended mode palette 10 is to operate in YUV-16 mode. Accordingly, the mode detector circuit 26d drives the YUV-16 mode enable signal high which, in turn, is inverted and provided as a first input to AND gate 26e. As YUV-8 mode enable is low, if YUV-16 mode enable is driven high, the first input to the AND gate will be low and the output of AND gate 26e will be low and the multiplexer 22 will be instructed to propagate video data output the 16-bit YUV decoder 18 to a YUV to RGB converter 20. In this manner, the decoding of 16-bit YUV video pixel data in which non-compressed, 16 bit YUV video pixel data encoded in a 8:4:4 format in which each pixel element of encoded video data has an associated 8-bit Y value representing the luminance component for that pixel element and in which one 8-bit U and one 8-bit V chrominance value is accumulated to represent the color component for two successive pixel elements. The input format for 16-bit YUV mode is as follows:

TABLE 5

| 7 | 6 | 5 | 4 | 3 | 2 | 1 | 0 |
|---|---|---|---|---|---|---|---|
| Byte 1 | | | | | | | |
| Y7 PEL #1 | Y6 PEL #1 | Y5 PEL #1 | Y4 PEL #1 | Y3 PEL #1 | Y2 PEL #1 | Y1 PEL #1 | Y0 PEL #1 |
| Byte 2 | | | | | | | |
| U7 PEL #1-2 | U6 PEL #1-2 | U5 PEL #1-2 | U4 PEL #1-2 | U3 PEL #1-2 | U2 PEL #1-2 | U1 PEL #1-2 | U0 PEL #1-2 |
| Byte 3 | | | | | | | |
| Y7 PEL #2 | Y6 PEL #2 | Y5 PEL #2 | Y4 PEL #2 | Y3 PEL #2 | Y2 PEL #2 | Y1 PEL #2 | Y0 PEL #2 |
| Byte 4 | | | | | | | |
| V7 PEL #1-2 | V6 PEL #1-2 | V5 PEL #1-2 | V4 PEL #1-2 | V3 PEL #1-2 | V2 PEL #1-2 | V1 PEL #1-2 | V0 PEL #1-2 |

As may be further seen in Table 5, color transitions are smoothed by interpolating values for the U and V components for even pixels. YUV interpolation is enabled if bit D4 has a value of 0 when bits D2:0 are equal to (0,1,1) or (1,0,0). In this event, the mode detector circuit 26b drives the interpolation enable line high, thereby instructing the 16-bit YUV decoder 18a and delta YUV decoder 18b to enable their respective interpolators. It should be noted, however, that while the present application discloses respective U and V interpolators for the 16-bit YUV decoder 18a and the delta YUV decoder 18b, it is specifically contemplated that the multiple extended mode palette 10 could be readily configured such that the 16-bit YUV decoder 18a and the delta YUV decoder 18b be provided with common U and V interpolators without departing from the scope of the present invention.

Interpolation for the 16-bit YUV decoder 18a is performed by computing the even pixel U and V values as the average of the preceding and subsequent values in accordance with the interpolation format illustrated below:

TABLE 6

| PEL: | 1 | 2 |
| --- | --- | --- |
| Y-value: | Y0 | Y1 |
| U-value: | (Ua + Ub)/2 | Ub |
| V-value: | (Va + Vb)/2 | Vb |

Referring momentarily to FIG. 2c, the 16-bit YUV decoder 18a will now be described in greater detail. The 16-bit YUV decoder 18a includes a first latch 18a-1 for latching a bit of the 8-bit Y component for each pixel of a pair of pixels, a second latch 18a-2 for latching a bit of the 8-bit U component for the pair of pixels and a third latch 18a-3 for latching a bit of the 8-bit V component for the pair of pixels. The BLANK and PELCLK signals are input a synchronizer 18a-4 which synchronizes the presentation of the Y, U and V data to the latches 18a-1, 18a-2 and 18a-3 by latching the first data byte when BLANK goes inactive. The output of U latch 18a-2 and V latch 18a-3 are then propagated to interpolators 18a-5 and 18a-6, respectively, where the U and V values are interpolated in accordance with the interpolation format set forth above. The Y, U and V values are then propagated to the multiplexer 22 where, if 16-bit YUV decoding is enabled, the Y, U and V values will be input the YUV to RGB converter for conversion into 8-bit red, green and blue values for each pixel element of the pixel element pair.

Returning now to FIGS. 2a-b, if bits D(2:0)=(1,0,0), the multiple extended mode palette 10 is to operate in an 8-bits/pixel element compressed (or "delta") YUV mode. Accordingly, the mode detector circuit 26d will drive YUV-8 mode enable high. As the YUV-16 mode enable is low, the first input to the AND gate 26e is high. Thus, when the YUV-8 mode enable line, which is provided as a second input to the AND gate 26e, is driven high, the output of the AND gate 26e goes high, thereby instructing the multiplexer 22 to propagate data output the delta YUV decoder 18d to the YUV to RGB converter 20.

Turning now to FIGS. 5-22, the decoding of 8-bit compressed YUV data by the delta YUV decoder 18b will now be described in greater detail. Referring first to FIG. 5, the delta YUV decoder 18b shown in FIG. 2 is comprised of a deformatter 40 and a DYUV decompressor 42. 8 bit PEL data, a blank signal, a reset signal and a clock signal labelled Pelclock, enter the delta YUV decoder 18b. The Pelclock is also directed to the DYUV decompressor 42 and the YUV-to-RGB converter 20 where it is redesignated as the Yclock since it becomes the clock signal utilized to move the Y data, or luminance component of the pixel data, through the different sections of the DYUV decompressor 42 and the YUV-to-RGB converter 20. The blank signal, utilized to "blank" the video screen between each full raster scanning of the video screen, is also directed to the DYUV decompressor 42. The blank signal is utilized to initialize the running sum registers within the DYUV decompressor 42 in preparation for new data values between the raster scans of each line of pixels. The reset signal initializes all circuit components on power up. This signal is also directed to the DYUV decompressor 42 and the YUV-to-RGB converter 20.

The deformatter 40 extracts the Y, U, V pixel data components and the transition codes from the 8 bit PEL data stream. These codes are labelled as Yprime, Uprime, Vprime and Transl. The Yprime, Uprime and Vprime codes are each 5 bits, and the Transl code is composed of 2 bits. In addition UVclock and UVclockd (delayed UVclock) signals are derived from the Pelclock. The UVclock and UVclockd are utilized in the deformatter 40 and DYUV decompressor 42 to transport the U and V chrominance components throughout these sections.

The Yprime, Uprime, Vprime, Transl, UVclock and UVclockd are transmitted from the deformatter 40 to the DYUV decompressor 42 where the 5 bit Yprime, Uprime and Vprime components are expanded to 8 bit values, followed by an interpolation of the U and V components for those pixel element values occurring at each color transition.

The 8 bit Y, U and V decoded data—labelled as Yout, Uout and Vout in FIG. 5—exits from the DYUV decompressor 42 and is clocked into the YUV-to-RGB converter 20 where this data is matrixed, or converted, into 8 bit red, green and blue components. The 8 bit red, green and blue components exit the YUV-to-RGB converter 20 and are clocked into the multiplexer 28, shown in FIG. 1, which subsequently transmits this data to the digital-to-analog converter 12 for conversion into video analog signals.

Figure 6:
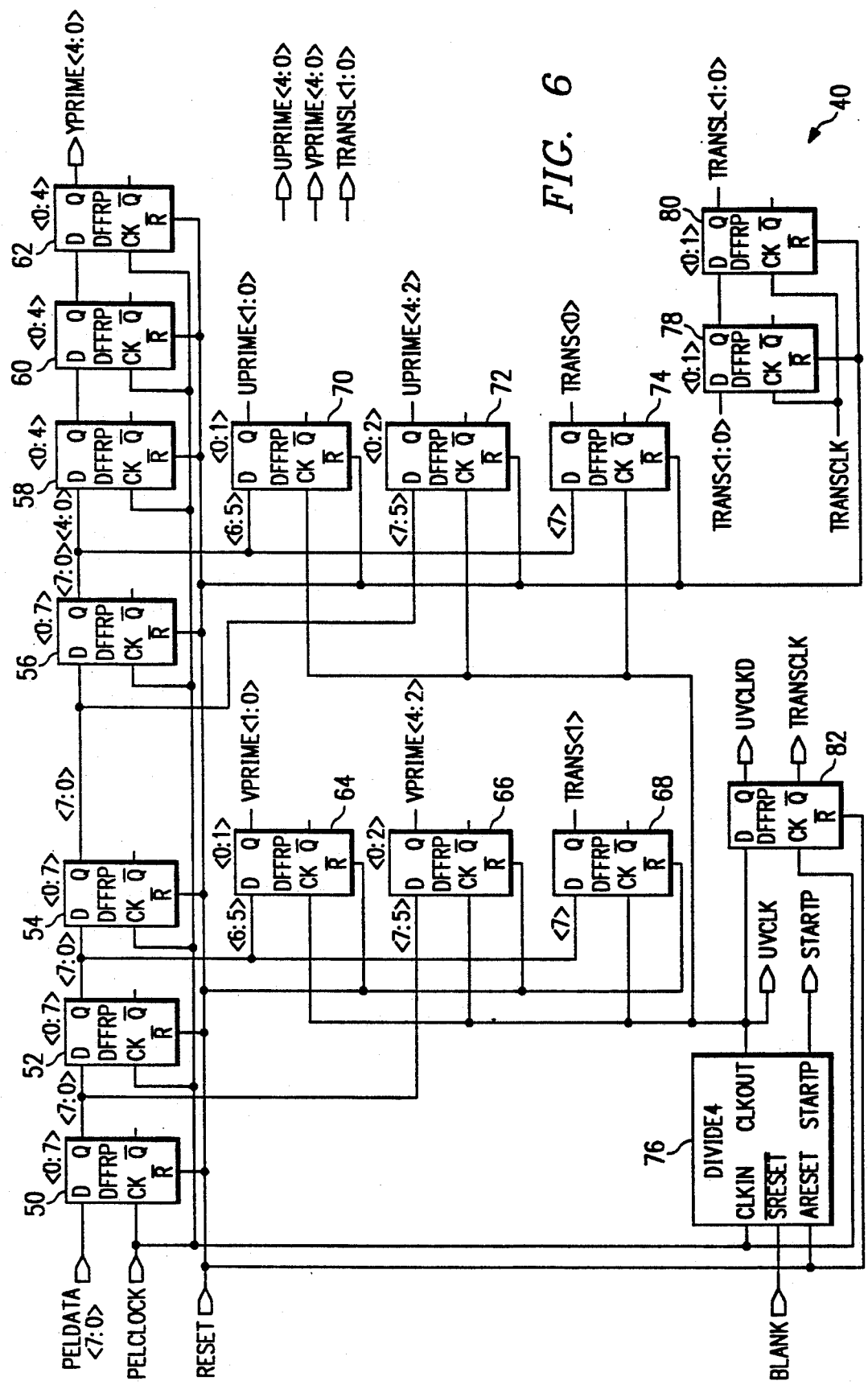
FIG. 6 is a schematic diagram of a deformatter of the delta YUV decoder of FIG. 5.

Referring now to FIG. 6, the 8 bit PEL data is clocked through flip-flops 50, 52, 54 and 56 by the Pelclock. The bytes located at the outputs of the flip-flops 50, 52, 54 and 56 are simultaneously clocked to various sections of the deformatter 40 by the UVclock which is produced by the divide 4 circuit 76 and which is at one-fourth the frequency of the Pelclock.

Figures 7, 8:
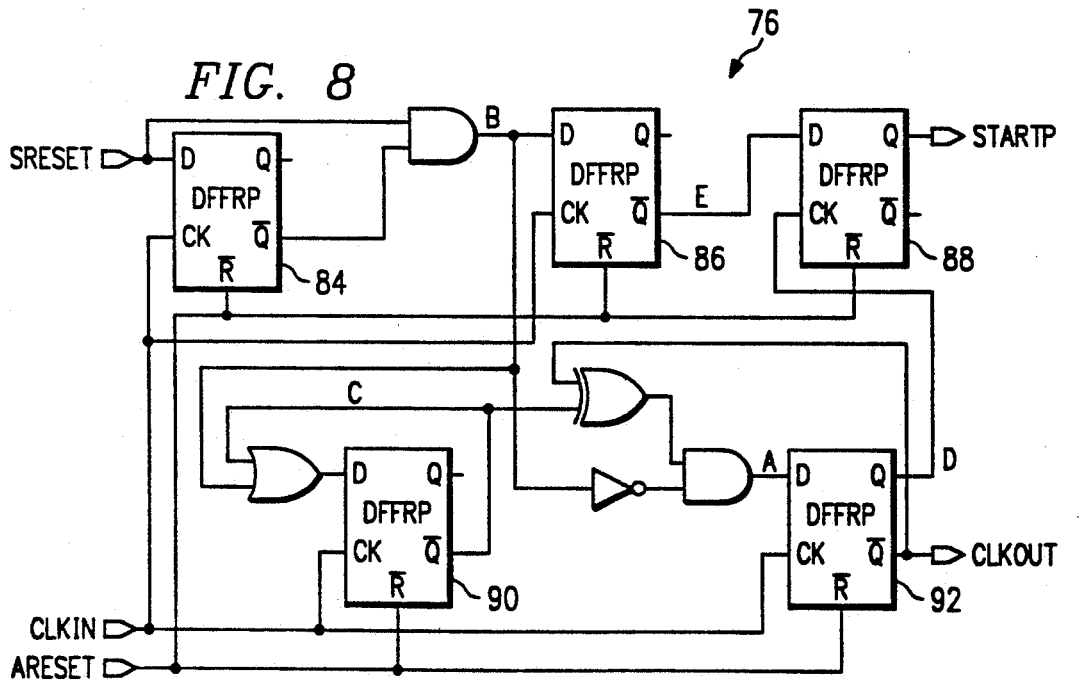
FIG. 7 is a diagram of the format of a delta YUV mode pixel field.
FIG. 8 is a schematic diagram of a divide-by-four circuit of the deformatter of FIG. 6.

The separate bytes located at each flip-flop 50, 52, 54 and 56 are shown in FIG. 7. Returning to FIG. 6, byte 1 will be located at the output of flip-flop 56, byte 2 located at flip-flop 54, byte 3 located at flip-flop 52 and byte 4 located at flip-flop 50. Bytes 1-4 contain all the pixel information needed to define the luminance and chrominance components and the position of any color transitions for a sequence of four pixels. It is at this point where these different elements of information are pipelined through different sections of the deformatter 40 and then combined into the separate data streams Yprime, Uprime, Vprime and Transl corresponding respectively to the differential Y luminance, differential U chrominance, differential V chrominance and position code components. These separate data streams are then ready for decoding and decompression by the DYUV decompress 42.

On the fourth clock cycle of Pelclock, byte 1 is located at the output of flip-flop 56. The five least significant bits are directed to flip-flop 58. These five bits define the differential Y luminance component for the first pixel element, PEL, of a four-pixel sequence as shown in FIG. 7. Bits 5 and 6 of byte 1 contain differential U chrominance bits 3 and 4, which along with differential U chrominance bits 0, 1 and 2 from bits 5, 6 and 7 of byte 2 define the differential U chrominance value for all four PEL of a four-pixel sequence. Returning to FIG. 6, bits 5 and 6 of byte 1 are directed to flip-flop 70. Bit 7 of byte 1 contains bit 0 of the 2-bit position code indicating where in the four-pixel sequence a major color transition might occur. Bit 7 is directed to flip-flop 74.

The output of flip-flop 54 contains byte 2 which is shown in FIG. 7. The five least significant bits contain the differential Y luminance component for the second PEL of a sequence of four bits. Bits 5, 6 and 7 contain bits 0, 1 and 2 of the five bits required to define the differential U chrominance value for the four-pixel sequence. In FIG. 6, bits 5, 6 and 7 are
directed to flip-flop 72. Bits 0–4 are directed to flip-flop 56.

The output of flip-flop 52 contains byte 3. As shown in FIG. 7, the five least significant bits of byte 3 contain the differential Y luminance component for the third PEL in a sequence of four pixels. Bits and 6 of byte 3 contain bits 3 and 4 of the differential V chrominance component for the four-pixel sequence. Bit 7 of byte 3 contains bit 1 of the position code.

Referring again to FIG. 6, bits 0–4 of byte 3 are directed to flip-flop 54, bits 5 and 6 are directed to flip-flop 64 and bit 7 is directed to flip-flop 68.

In FIG. 7, byte 4 contains the differential Y luminance component for the fourth PEL of a four-pixel sequence. This component is encoded in bits 0–4. Bits 5–7 of byte 4 contain bits 1–3 of the differential V chrominance encoded value for the four pixels of a sequence.

Referring to FIG. 6, byte 4 is at the output of flip-flop 50. Bits 0–4 are directed to flip-flop 52 while bits 5–7 are directed to flip-flop 66.

On the next clock cycle, the divide 4 circuit 76 produces a clock signal, UVclock, which toggles flip-flops 64, 66, 68, 70, 72 and 74 allowing their respective bits to cycle through. In addition, the Pelclock toggles flip-flops 50, 52, 54, 56, 58, 60 and 62 allowing the data present at their respective inputs to cycle through. It is through this previously described arrangement of flip-flops that the differential Y, U, V and position code components are partitioned from the original pixel data stream and separately united to form the Yprime, Uprime, Vprime and Transl data streams.

The differential Y luminance bit components are cycled through flip-flops 50, 52, 54, 56, 58, 60 and 62 producing the Yprime output. Flip-flops 58, 60 and 62 are present for synchronization purposes since the U, V and Transl components are clocked through the deformatter 40 and DYUV decompressor 42 at one-fourth the frequency of the Y luminance components.

Bits 5 and 6 of byte 1 and bits 5–7 of byte 2 are cycled through flip-flops 70 and 72 respectively and combined to form the Uprime output data stream. Bits 5 and 6 of byte 3 and bits 5–7 of byte 4 are cycled through flip-flops 64 and 66 respectively to form the Vprime output data stream.

Bit 7 of byte 1 and bit 7 of byte 3 are cycled through flip-flops 74 and 68 respectively to form a 2-bit Transl output. The Transl signal is then further cycled through flip-flops 78 and 80 so that all the components of the video pixel data are properly synchronized.

The clock signals, UVclock and Transclock, for toggling flip-flops 64, 66, 68, 70, 72, 74, 78 and 80 are provided by the Divide 4 Circuit 76. The UVclock signal is one-fourth the frequency of the Pelclock signal since the UVclock cycles the U and V chrominance components through the delta YUV decoder 18b, and these components are only required to change every four pixels whereas the Y component changes every pixel. In addition, the Transclock signal is also one-fourth the frequency of the Pelclock signal since the position code, which is cycled by the Transclock, is only required to be designated every four pixels. Thus, the divide 4 circuit 76 is necessary to produce clock signals at one-fourth the frequency of the Pelclock.

Referring to FIG. 8, three signals are inputted to the divide 4 circuit 76—Clock-in, A-Reset and S-Reset. A-Reset is connected to the Reset on all flip-flops 84, 86, 88, 90 and 92 within the divide 4 circuit 76. A-Reset originates from the system power up reset which is utilized to asynchronously reset all flip-flops within the delta YUV decoder 18b on power up.

Clock-in, originating from the Pelclock signal, is utilized to toggle flip-flops 84, 86, 90 and 92. S-Reset originates from the active low blank signal supplied to the delta YUV decoder 18b by the VGA controller circuitry. S-Reset becomes inactive, or high, whenever the blank signal goes high, allowing the decoder circuitry to be resynchronized at the start of each horizontal line of pixels.

Figure 9:
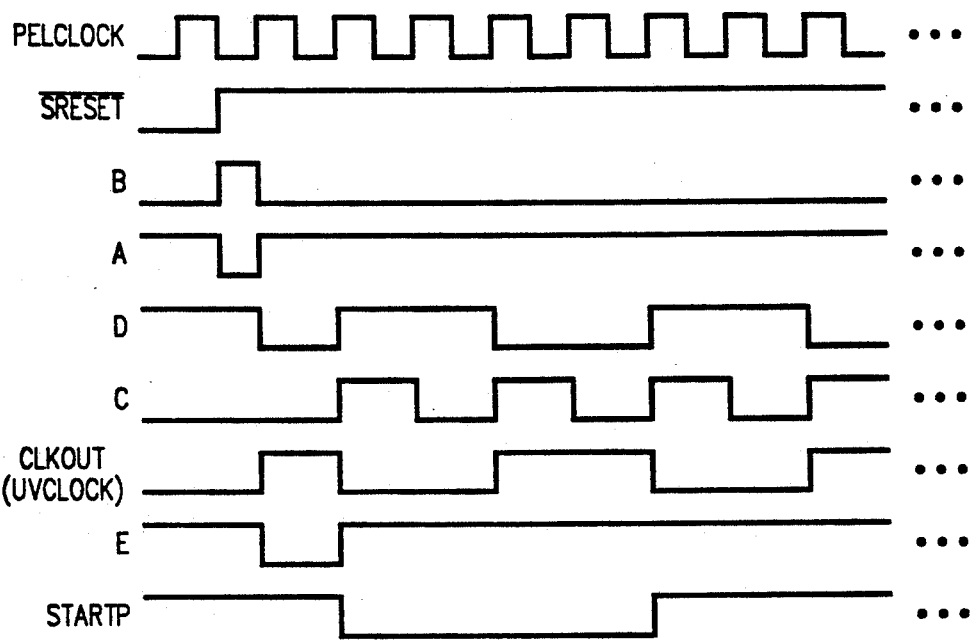
FIG. 9 is a timing diagram of a flow process through the divide-by-four circuit of FIG. 8.

FIG. 9 shows the timing diagram of the divide 4 circuit 76. It indicates how the outputs of this circuit are produced and their timing. The divide 4 circuit 76 produces a Clock-out signal which is utilized to cycle the U and V chrominance components through the delta YUV decoder 18b circuitry. This signal, which is at one-fourth the frequency of the Pelclock is labeled UVclock. The Clock-out is also utilized to produce the Transclock signal which is also at one-fourth the frequency of the Pelclock. The Transclock is required to be one Pelclock cycle ahead of the UVclock, therefore the Clock-out is directed to a flip-flop 82 as shown in FIG. 6 and inverted to produce the correctly timed Transclock. Flip-flop 82 also produces a delayed UVclock signal utilized in interpolating the U and V chrominance values.

The divide 4 circuit 76 also provides a StartP signal utilized in the DYUV decompressor 42.

Again referring to FIG. 6, the Pelclock, UVclock and Transclock signals cycle the PEL data into and through the deformatter 40 eventually producing the separate output data streams—the 5 bit Yprime, Uprime and Vprime and the 2-bit Transl. The timing is synchronized so that every four bytes of PEL data produces the necessary information for the color values of each pixel in a four-pixel sequence. This process, which is continuously repeated, is illustrated by the timing diagram in FIG. 10. As indicated, the UVclock is one-fourth the frequency of the Pelclock. The Pelclock cycles the Y luminance data and the UVclock cycles the U and V chrominance data through the circuitry. The Transclock, which is also at one-fourth the frequency of the Pelclock, cycles the Transl code through the circuitry.

Figure 11:
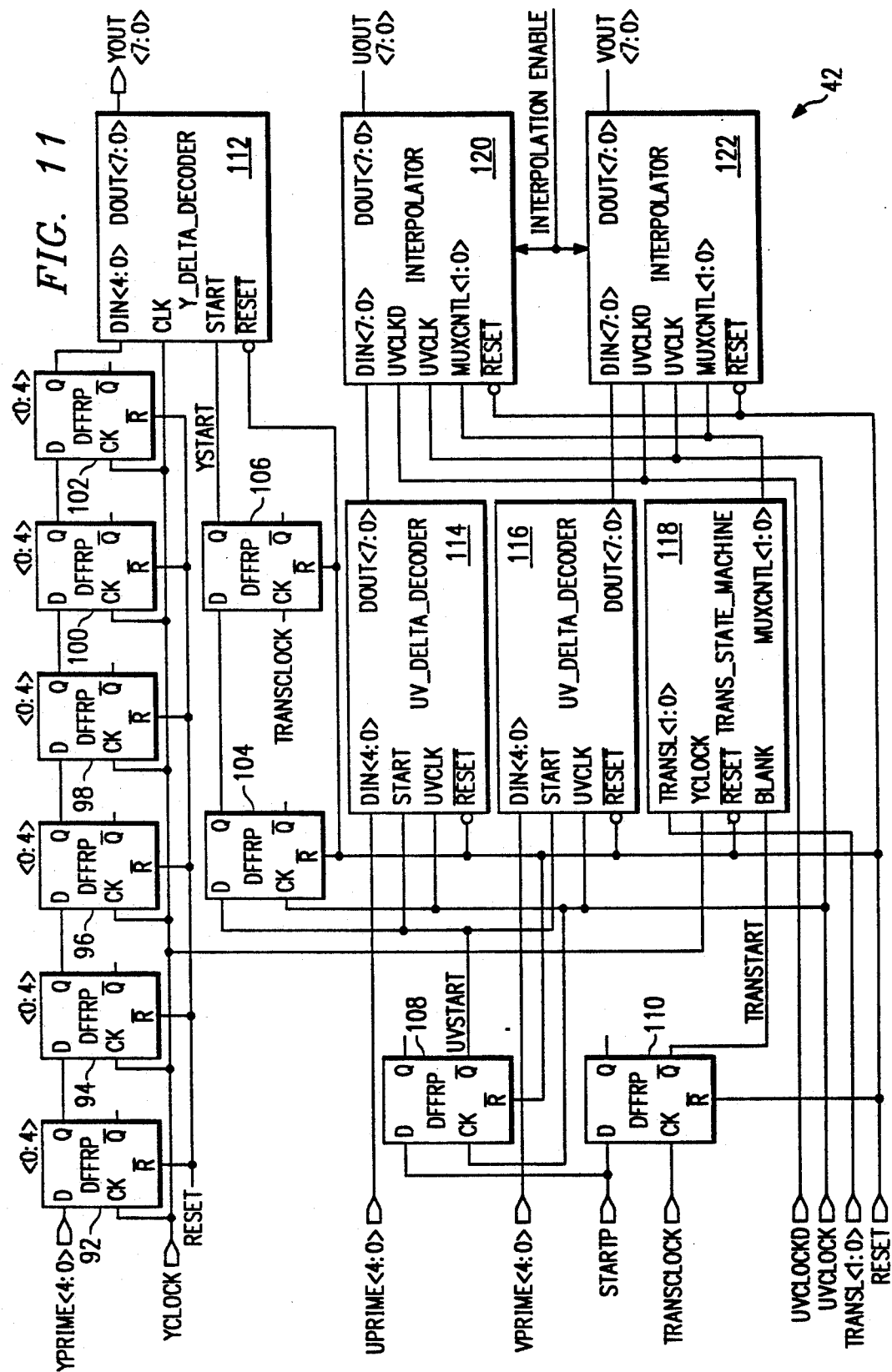
FIG. 11 is a schematic diagram of a DYUV decompressor of the delta YUV decoder of FIG. 5.

Referring to FIG. 11, the data exiting the deformatter 40 enters the DYUV decompressor 42 where it is transformed into 8 bit per pixel values of Y luminance, U chrominance and V chrominance components. The incoming data signals consist of Yprime, Uprime, Vprime, Pelclock, StartP, Transclock, UVclock, UVclockd, Transl and Reset. Yprime, Uprime, Vprime and Transl contain the data needed to define each pixel. Pelclock, UVclock and Transclock are the timing signals needed to cycle the data signals through the circuitry. StartP signals the DYUV decompressor 42 components to accept initialization values for the incoming data streams at the start of a line. And, Reset is a signal used to reset the components of the DYUV decompressor 42 on power up.

The 5 bit Yprime data enters the DYUV decompressor 42 and is cycled through flip-flops 92, 94, 96, 98, 100 and 102 by the Pelclock. These flip-flops are present for timing purposes only so that the Yprime, Uprime, Vprime and Transl data streams are all aligned synchronously. The Yprime data then enters a Y Delta Decoder 112 when signalled to do so. The incoming Uprime and Vprime data enters UV delta decoders 114 and 116 at appropriate times. The 2-bit Transl data enters a Trans State Machine 118 when properly signalled.

The StartP signal, which is generated within the deformatter 40, is the timing signal that allows the initialization value for each line of the Yprime, Uprime, Vprime and Transl data to be cycled into the DYUV decompressor 42. Referring to FIG. 11 and the timing diagram in FIG. 12, when StartP gets low, the inversed output of flip-flop 108 will become high when flip-flop 108 is toggled by UVclock. The inverse output of flip-flop 108, designated as UVstart, signals the UV Delta Decoders 114 and 116 to load their accumulation registers with the initialization values given at the start of each line. Additionally, the UVstart signal is cycled through flip-flop 104 when it is toggled by UVclock. The output signal from flip-flop 104 will cycle through flip-flop 106 when flip-flop flop 106 is toggled by the Transclock. The output of flip-flop 106 is the Ystart signal which loads the initialization value for the Yprime data into the Y delta decoder 112.

StartP also enters flip-flop 110 which, when toggled by the Transclock, produces a Transtart signal at its inversed output. Transtart synchronizes the operation of the trans state machine 118 at the start of each line.

The Y delta decoder 112 decompresses the 5 bit differential Yprime data into 8 bit per pixel Y luminance components, labelled as Yout in FIG. 11. The 8 bit Yout data is then transmitted to the YUV-to-RGB converter 20.

The UV delta decoders 114 and 118 decompress the differential Uprime and Vprime data streams into 8 bit per pixel U and V chrominance components respectively. These 8 bit outputs are directed to interpolators 120 and 122 where the U and V chrominance values are designated for the pixels before and after each color transition, and an interpolated color value is calculated for the pixel occurring immediately prior to a color transition. The outgoing data from the interpolators 120 and 122, labelled Uout and Vout respectively, is then directed to the YUV-to-RGB Converter 20.

Figure 12:
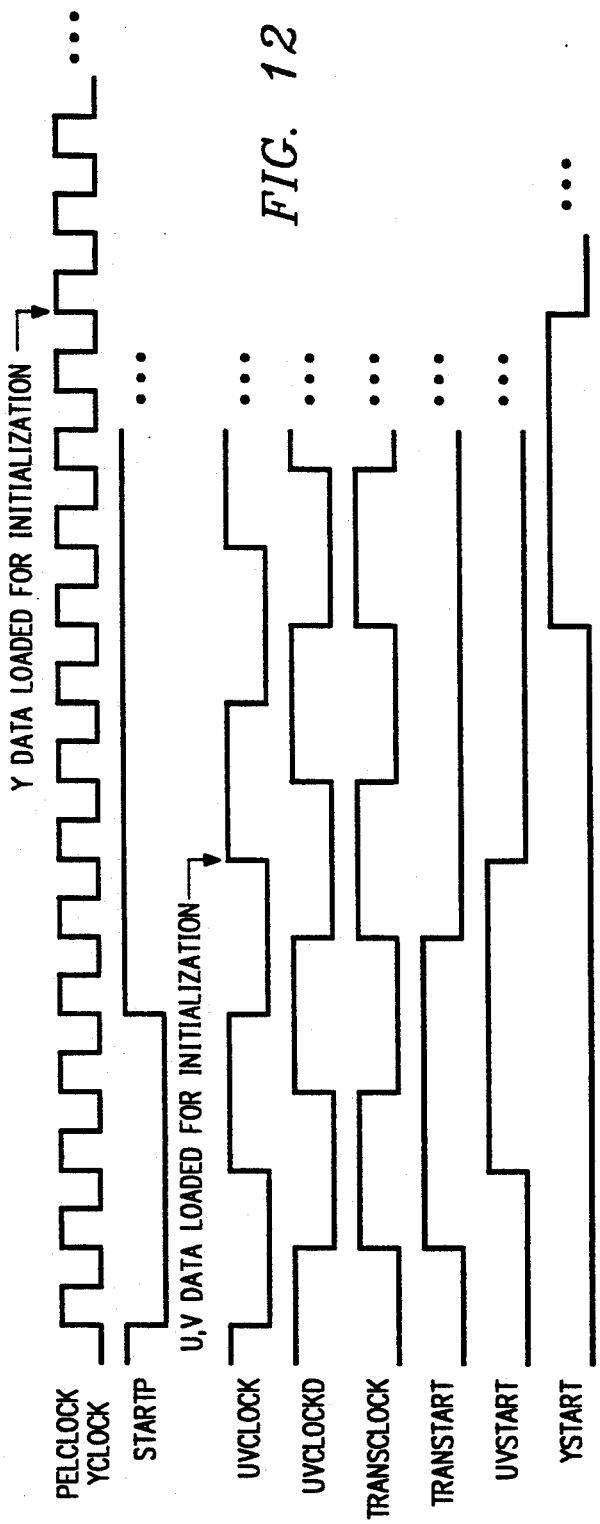
FIG. 12 is a timing diagram for the DYUV decompressor of FIG. 11.
Figure 13:
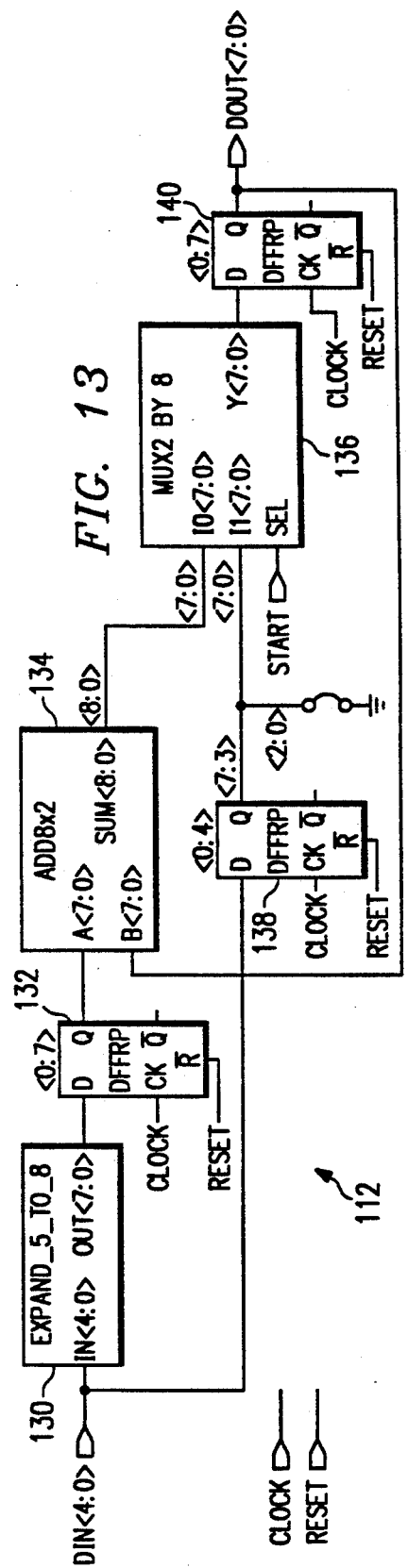
FIG. 13 is a schematic diagram of a Y delta decoder of the DYUV decompressor of FIG. 11.

Referring to FIG. 11, incoming 5 bit Yprime data will be cycled into the Y delta decoder 112 when the Ystart signal becomes high. Referring to FIG. 12, the Ystart signal has a width of four cycles to provide the pixel values for the first four-pixel sequence to be initialized on each horizontal pixel line. This is accomplished by the Ystart signal choosing input I1 in Mux2by8 136. This selection bypasses the remainder of the circuitry of the Y delta decoder 112 which calculates a running sum of Y luminance difference values to calculate an 8 bit per pixel Y luminance value for the subsequent pixels in each horizontal pixel line.

When Ystart goes high, the 5 bit Yprime data enters the Y delta decoder 112. For the first pixel of the first four-pixel sequence of each line, the Ystart signal selects the 8 bit I1 input to the Mux2by8 136. The Yprime data is toggled through flip-flop 138 by the Pelclock. Flip-flop 138 is present for timing purposes only. The 5 bit Yprime data exits flip-flop 138 and enters 8 bit input I1 to the Mux2by8 136 as bits 3–7; bits 0–2 are set to zero by virtue of being grounded. Thus input I1 consists of 8 bits with the five most significant bits comprised of the 5 bit Yprime data. The Mux2by8 136 transmits the 8 bit word to accumulation register 140, used for accumulating a running sum of the Yprime data, and the output of the Y Delta Decoder 112. This 8 bit word becomes the initial Y luminance value for the first pixel of a horizontal line of pixels.

This outputted 8 bit initial luminance value is also fed back to an Add 8×2 Block 134 so that the next 8 bit luminance difference value can be added to the initial value to derive the Y luminance value for the next pixel in a horizontal line of pixels.

Figure 14:
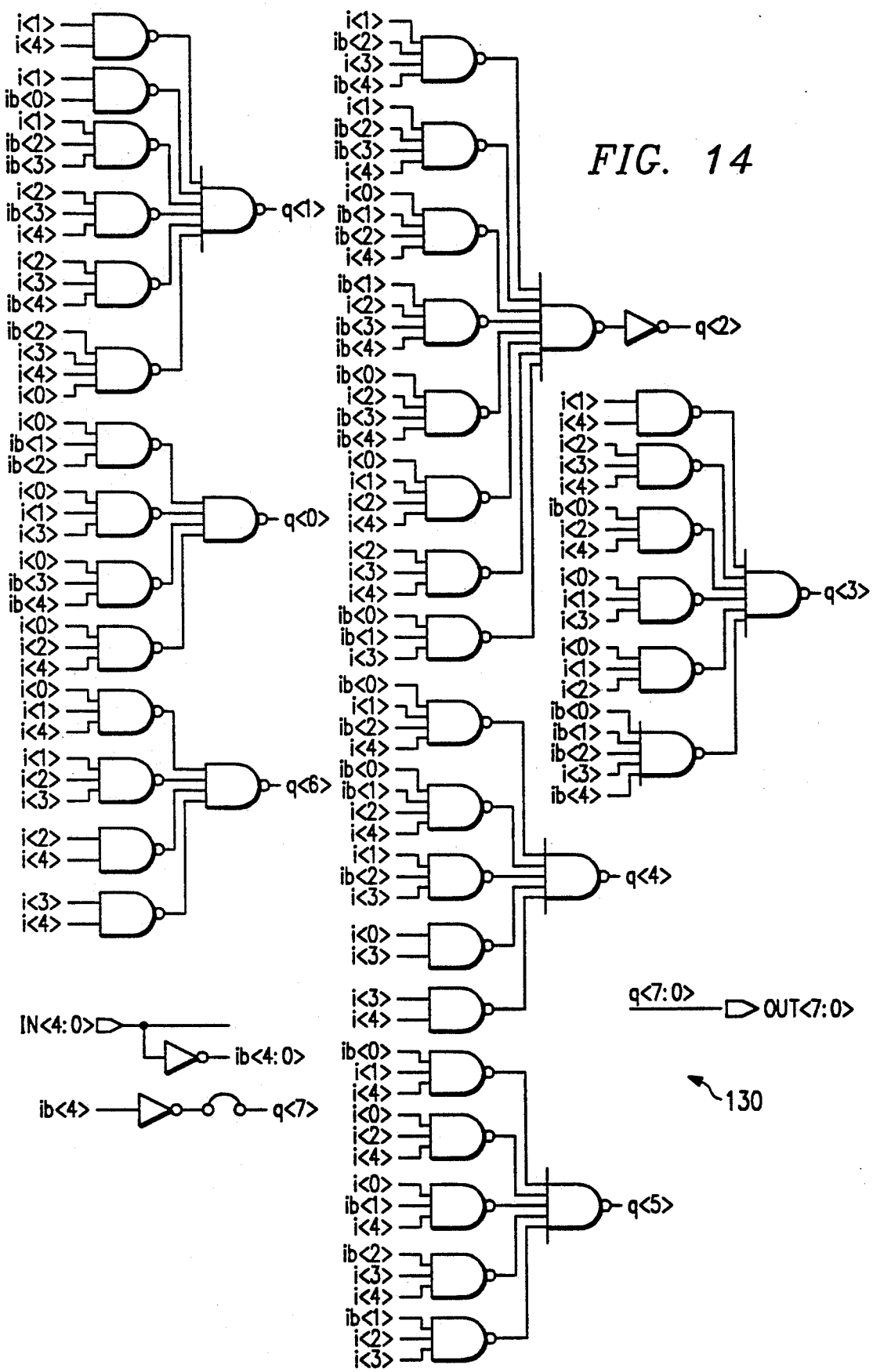
FIG. 14 is a schematic diagram of a 5 bit to 8 bit expander of the Y delta decoder of FIG. 13.

After the Ystart has entered the initial Y luminance component, the Ystart signal becomes low thus selecting the input I0 to the Mux2by8 136. The subsequent 5 bit Y luminance difference values enter an expand 5 to 8 block 130 where the 5 bit difference values are expanded back to their original 8 bit values. The expansion circuitry is shown in FIG. 14. The circuitry implements the conversion table set forth below.

TABLE 7

| 5 bit Values | 8 bit Values |
| --- | --- |
| 0 | 0 |
| 1 | 1 |
| 2 | 2 |
| 3 | 3 |
| 4 | 4 |
| 5 | 5 |
| 6 | 6 |
| 7 | 9 |
| 8 | 12 |
| 9 | 17 |
| 10 | 22 |
| 11 | 29 |
| 12 | 38 |
| 13 | 50 |
| 14 | 66 |
| 15 | 91 |
| 16 | 128 |
| 17 | 165 |
| 18 | 190 |
| 19 | 206 |
| 20 | 218 |
| 21 | 227 |
| 22 | 234 |
| 23 | 239 |
| 24 | 244 |
| 25 | 247 |
| 26 | 250 |
| 27 | 251 |
| 28 | 252 |
| 29 | 253 |
| 30 | 254 |
| 31 | 255 |

After expansion to 8 bits, the difference value data toggles through flip-flop 132, used for timing and enters an input A to the add 8×2 block 134. The add 8×2 block 134 sums each 8 bit luminance difference value to the preceding sum of 8 bit luminance difference values. Thus, the luminance value for each pixel within a horizontal pixel line is computed and directed to the output of the Y delta decoder 112. This running sum is accomplished by feeding back the outputted sum to input B of the add 8×2 block 134. This sum entering input B is added to the next luminance difference value entering input A of the add 8×2 block 134. This process is repeated until all pixels within a horizontal pixel line are designated with a Y luminance value. Then, another Ystart signal will begin the process anew for the next horizontal line of pixels.

Figure 15:
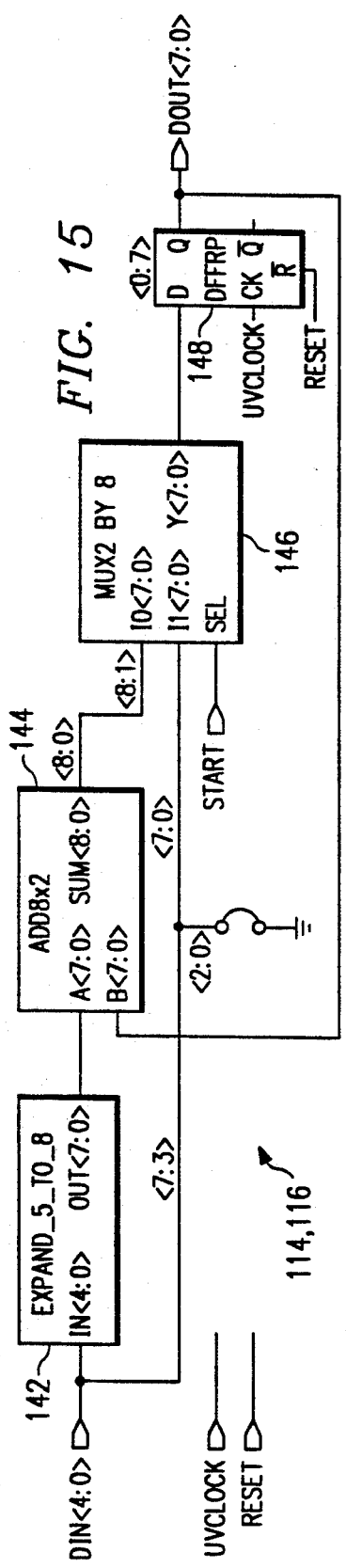
FIG. 15 is a schematic diagram of a UV delta decoder of the DYUV decompressor of FIG. 11.
Figure 16:
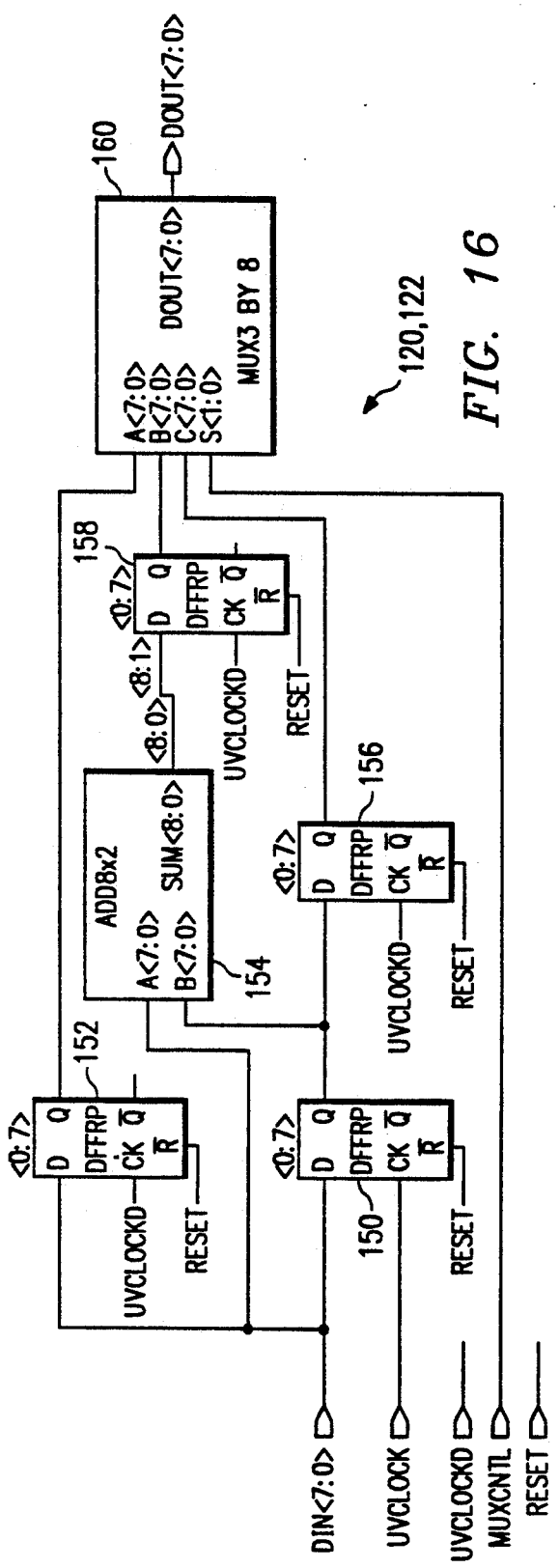
FIG. 16 is a schematic diagram of an interpolator of the DYUV decompressor of FIG. 11.

The 5 bit Uprime and Vprime data are decoded and expanded to 8 bit values in the UV delta decoders 114 and 116 respectively, as illustrated in FIG. 15., which are identical to the Y delta decoder 112 with the exception that the timing flip-flops 132 and 138 are not required. The outputs of the UV delta decoders 114 and 116 produce 8 bit U and V chrominance components for each four-pixel sequence. These outputs are directed to first and second interpolators 120 and 122, respectively.

Figure 10:
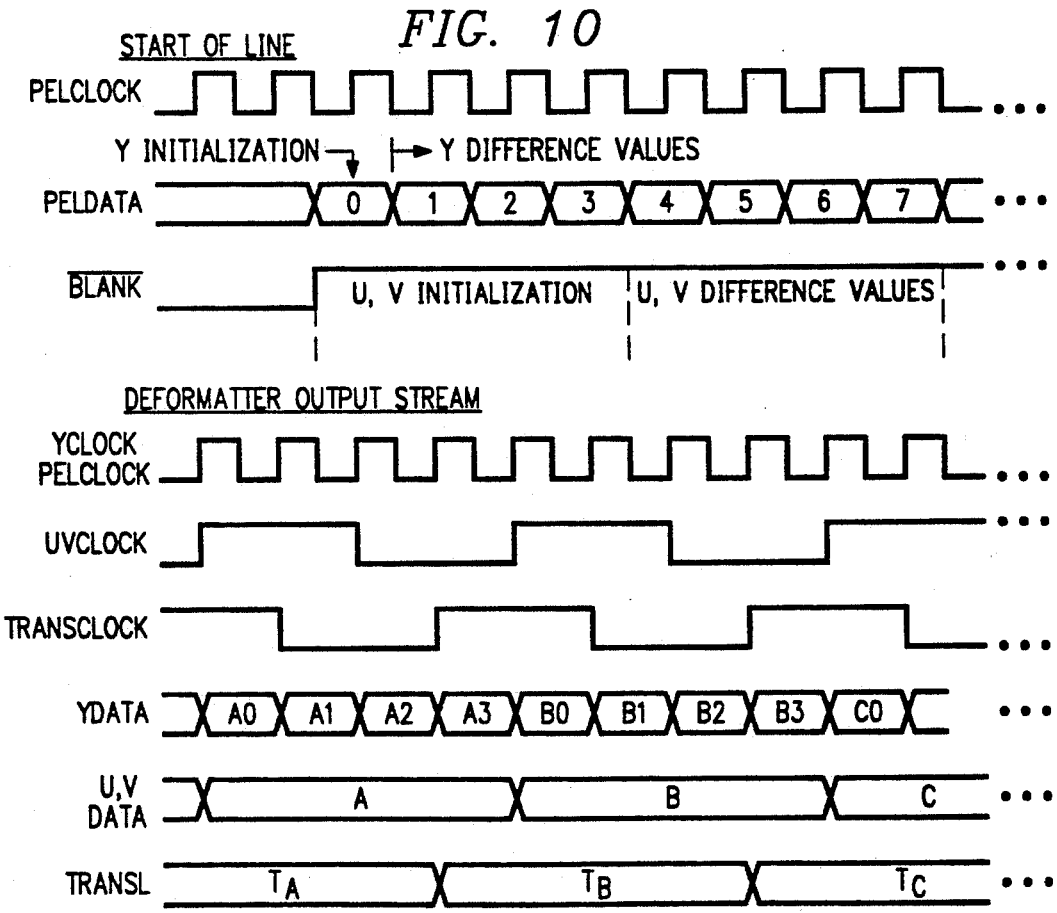
FIG. 10 is a timing diagram for the deformatter of FIG. 6.

Referring to FIG. 10, interpolators 120 and 122, which are identical, receive the 8 bit U and V chrominance components from the UV delta decoders 114 and 116, and also receive the UVclock, the UVclockd, the system reset and a 2-bit control signal, labeled Muxcntl. As previously noted, while the present application discloses respective U and V interpolators for the 16-bit YUV decoder 18a and the delta YUV decoder 18b, it is specifically contemplated that the multiple extended mode palette 10 could be readily configured such that the 16-bit YUV decoder 18a and the delta YUV decoder 18b be provided with common U and V interpolators without departing from the scope of the present invention.

YUV interpolation is enabled if bit D4 has a value of 0 when bits D2:0 are equal to (0,1,1) or (1,0,0). In this event, the mode detector circuit 26b drives the interpolation enable line high, thereby instructing the 16-bit YUV decoder 18a and delta YUV decoder 18b to enable their respective interpolators. Once enabled, by the interpolation enable line, in the interpolator 120, the 8 bit U chrominance data for successive groups of four pixels is presented to three different data paths. The U chrominance data is manipulated so that a MUX 3by8 multiplexer 160 is presented with the U chrominance value for a group of four pixels, the U chrominance value for the previous group of four pixels and an interpolated U chrominance value, equal to the average between the U chrominance values for a group of four pixels and the previous group of four pixels.

For example, if the U chrominance value, N, for the N group of four pixels enters the interpolator 120, it will be simultaneously presented to timing latch 152, storage latch 150 and add 8×2 Block 154. The UV clock signal, UVclock, has already cycled through storage latch 150 the previous U chrominance value, N−1, for the previous group of four pixels. This U chrominance value, N−1, is then added to the U chrominance value, N, in the add 8×2 Block 154. The least significant bit is subsequently dropped, effectively dividing by two the added value of N+(N−1). This averaged U chrominance value is presented to timing latch 158. The delayed UV clock signal, UVclockd, then toggles timing latches 152, 156 and 158. Timing latch 152 cycles through the U chrominance value, N, to input A of the MUX 3by8 multiplexer 160. Timing latch 158 cycles through the interpolated U chrominance value, N+(N−1)/2, to input B of the MUX 3by8 multiplexer 160. timing latch 156 cycles through the previous U chrominance value, N−1, to input C of the MUX 3by8 multiplexer 160.

These three U chrominance values N, N−1 and N+(N−1)/2 are then utilized to determine the U chrominance values for each pixel within a group of four pixels. The Muxcntl signal controls the selection of U chrominance values. The Muxcntl signal is dependent upon the value of the 2-bit position code, Transl, which determines where in a sequence of four pixels a color transition occurs. If the position code is a 0, then the color transition occurs between the first and second pixels within a sequence of four pixels. If the position code is a 1, then the color transition occurs between the second and third pixels within a sequence of four pixels. If the position code is a 2, then the color transition occurs between the third and fourth pixels within a sequence of four pixels. And, if the position code is a 3, then the color transition occurs between the fourth pixel of a sequence of four pixels and the first pixel in the subsequent sequence of four pixels. The previously described process is also enabled for the V chrominance data passing through the interpolator 122.

For a smoother transition of color, an interpolated value for the U and V chrominances can be inserted in the pixel immediately preceding the color transition.

Figure 17:
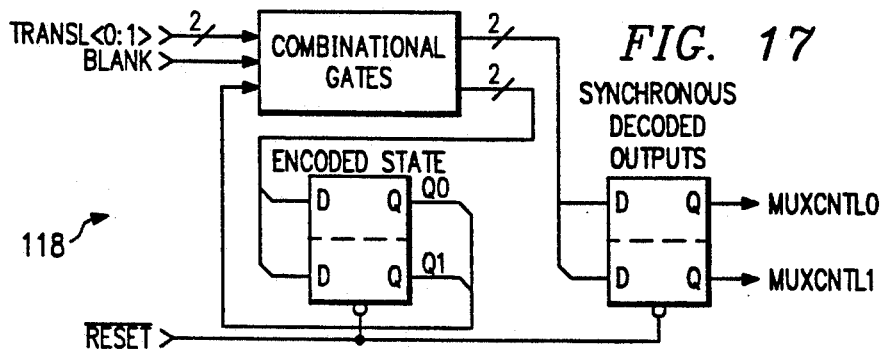
FIG. 17 is a schematic diagram of a trans-state machine of the DYUV decompressor of FIG. 11.
Figure 18:
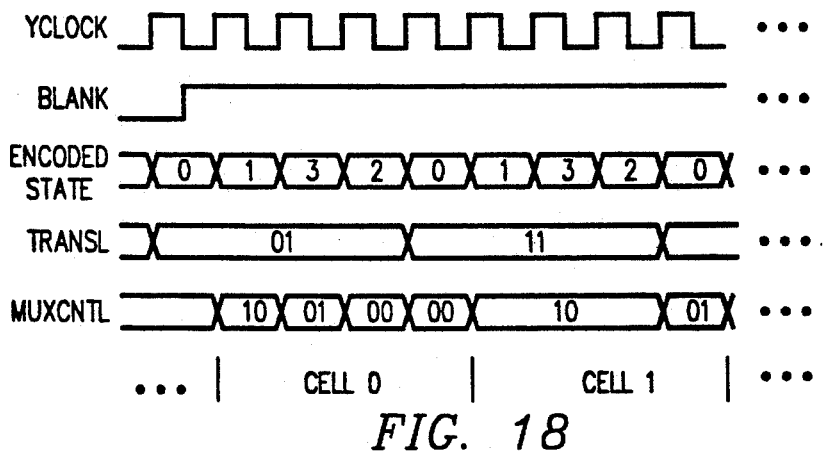
FIG. 18 is a timing diagram for the trans-state machine of FIG. 17.

The Muxcntl signal originates in a trans state machine 118, shown in FIGS. 11 and 17. Upon the Transtart signal becoming high, the trans state machine 118 receives the 2-bit Transl code and produces a series of control signals, Muxcntl, which determine the correct U and V chrominance value to choose for each pixel within a sequence of four pixels. FIG. 18 shows the timing sequence within the trans state machine 118.

Figure 19A:
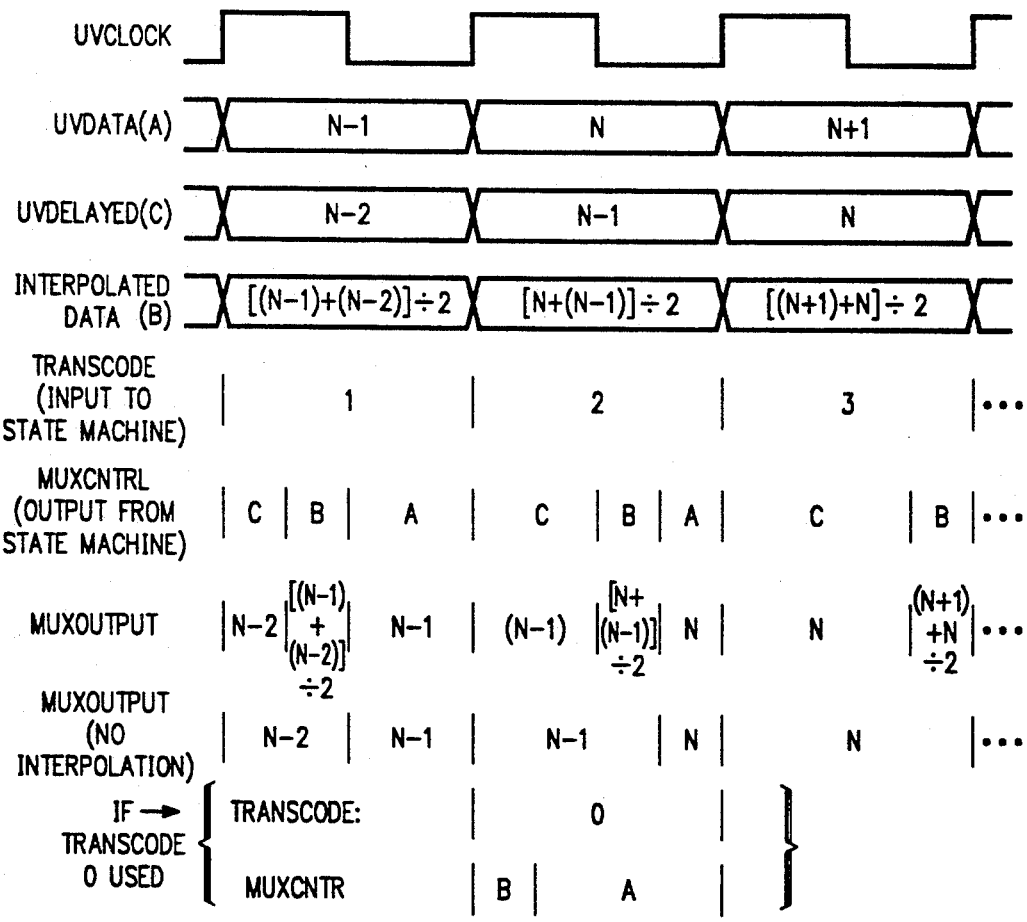
FIG. 19a is a timing diagram for the interpolator of FIG. 16.

A representative timing diagram of the interpolation process is shown in FIG. 19a. With each rise of the UVclock signal, a set of U and V chrominance values is processed through the Interpolators 120 and 122. Entering the MUX 3by8 multiplexer 160 are the U and V chrominance values for the present sequence of four pixels, the previous sequence of four pixels and the interpolated values. These are represented in FIG. 19a by "A", "C" and "B" respectively.

Inputted to the trans state machine 118 is the position code, Transl. In FIG. 19A, the position code, Transl, for the first sequence of four pixels is 1. The trans state machine 118 outputs control signals, Muxcntl, corresponding to the inputted position code. Since the position code for the first sequence of four pixels is 1, the color transition occurs between the second and third pixels and the interpolated values for the U and V chrominances will be designated for the second pixel. Thus, the Muxcntl signal will direct the MUX 3by8 multiplexer 160 to select the previous U and V chrominance value, C, for the first pixel, the interpolated U and V chrominance values, B, will be selected for the second pixel and the present U and V chrominance values, A, will be selected for pixels three and four.

Proceeding to the next rise of the UVclock signal in FIG. 19a, the process is repeated for the corresponding sequence of four pixels. In this case the position code is 2 corresponding to a color transition occurring between the third and fourth pixels. Thus the trans state machine 118 will produce control signals, Muxcntl, directing the MUX 3by8 multiplexer 160 to select the previous four-pixel group's U and V chrominance values, C, for pixels one and two; the interpolated U and V chrominance values, B, will be selected for the third pixel; and, the current U and V chrominance values, A, will be selected for the fourth pixel.

Proceeding to the third rise of the UVclock signal in FIG. 19A, the process is again repeated for the corresponding sequence of four pixels wherein the position code, Transl, is a 3. Therefore, the color transition occurs at the boundary between the current sequence of four pixels and the next sequence of four pixels. The trans state machine 118 will produce Muxcntl control signals directing the MUX 3by8 multiplexer 160 to select the U and V chrominance values, C, from the previous sequence of four pixels for the first, second and third pixels of the current sequence of four pixels, and the interpolated U and V chrominance values, B, will be selected for the fourth pixel.

If the position code for a sequence of four pixels is 0, corresponding to a color transition occurring between the first and second pixels, then the trans state machine 118 will direct the MUX 3by8 multiplexer 160 to select the interpolated U and V chrominance values, B, for the first pixel, and the current U and V chrominance values, A, will be selected for the second, third and fourth pixels in the current sequence of four pixels.

If desired, the interpolated values B, can be omitted from being selected by the MUX 3by8 multiplexer 160. In this case, the pixel which ordinarily would receive the interpolated U and V chrominance values, B, will receive the previous U and V chrominance values, C.

As previously described, the MUX 3by8 multiplexer 160 selects the U and V chrominance values for each pixel within a sequence of four pixels. More specifically, the MUX 3by8 multiplexer 160 within interpolator 120 selects the proper U chrominance values for each pixel, and the MUX 3by8 multiplexer 160 within interpolator 122 selects the proper V chrominance values for each pixel.

Referring to FIG. 11, the 8 bit Y luminance, 8 bit U chrominance and the 8 bit V chrominance data streams exit the Y delta decoder 112, interpolator 120 and interpolator 122 respectively. These three data streams, along with the Yclock and reset signals, are transmitted to the YUV-to-RGB converter 20 for conversion into red, blue and green components for each PEL.

Figure 20:
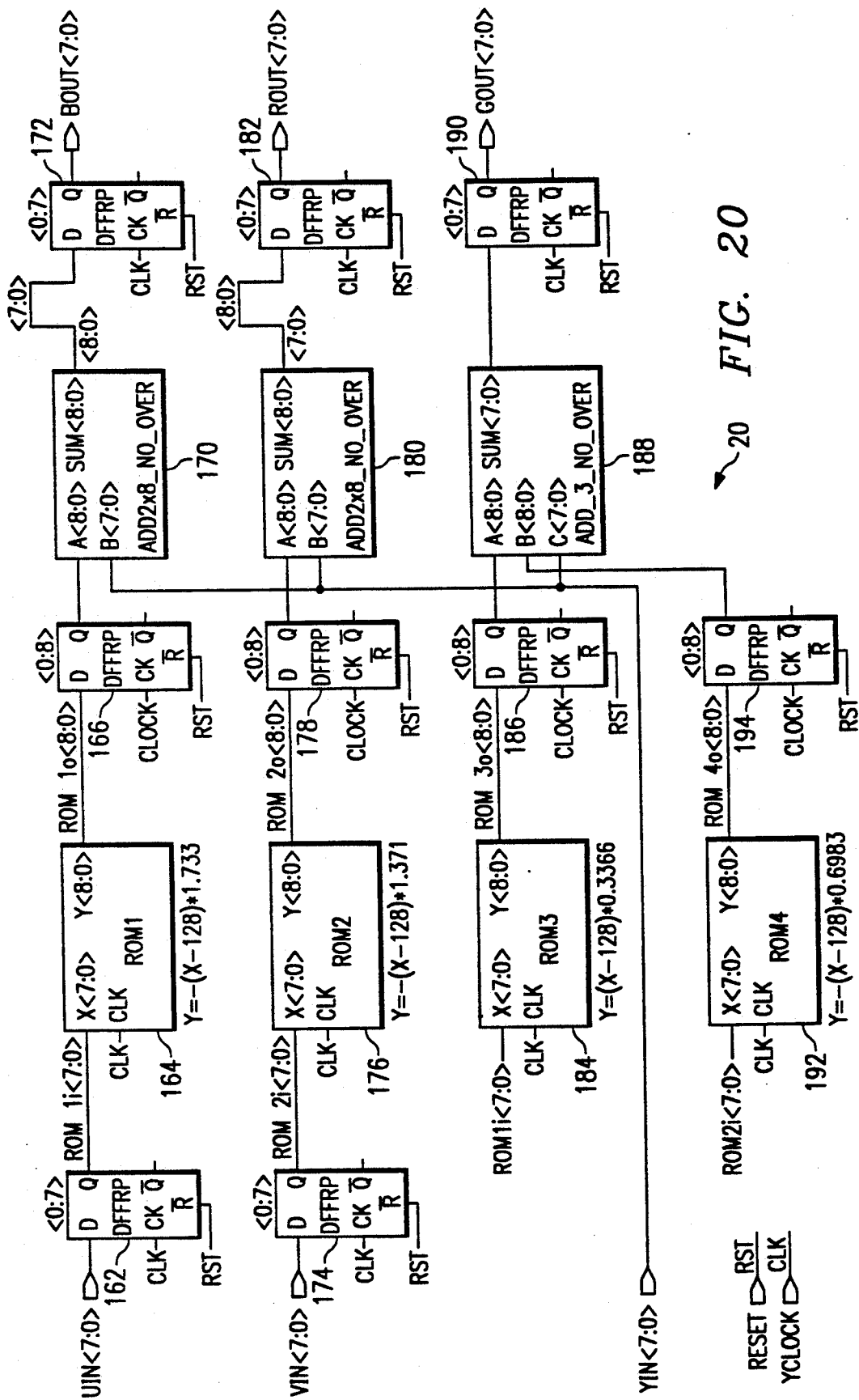

Referring to FIG. 20, the operation of the YUV-to-RGB converter 20 is further detailed. The 8 bit U chrominance data cycles through a timing latch 162 and into a ROM 164 which effectively performs a calculation on every 8 bit U chrominance value. The ROM 164 performs the following calculation on U: A=-(U−128)*1.733. The results of these calculations are cycled through timing latch 166 into an ADD 2×8-no-overflow summation block 170, which adds each A to its corresponding 8 bit Y luminance value to produce the blue color component for each PEL. Effectively, the ADD 2×8-no-overflow summation block 170, which is further detailed in FIG. 22, performs the following calculation: BLUE=Y+A Y+[-(U−128)*1.733]. In addition, the ADD 2×8-no-overflow summation block 170 detects overflow and underflow conditions within the resulting sum, BLUE, thereby ensuring that the sum, BLUE, does not exceed the range of 0 to 255. The resulting 9-bit summed value has its most significant bit, which is the sign designation and will always equal 0, dropped and then is cycled through timing latch 172 before exiting the YUV-to-RGB converter 20.

The incoming 8 bit V chrominance values are cycled through a timing latch 174 before entering a ROM 176 which performs the following calculation: A=(V−128)*1.371. The results pass through timing latch 178 before entering an ADD 2×8-no-overflow summation Block 180, which operates identically to the ADD 2×8-no-overflow summation block 170, where they are added to corresponding 8 bit Y luminance values to produce the red color component for each PEL as such: RED=Y+A =Y+[(V−128)*1.371]. The most significant bit, which is the sign designation and will always equal 0, is dropped from the 9-bit result and subsequently cycled through timing latch 182 before exiting the YUV-to-RGB converter 20.

To produce the green color component for each PEL, the 8 bit U and V chrominance components exiting from timing latches 162 and 174 respectively are also directed to ROM 184 and ROM 192 respectively. ROM 184 performs the following calculation on each 8 bit U chrominance value: A=−(U−128)*0.3366. ROM 192 performs the following calculation on each 8 bit V chrominance value: B=−(V−128)*0.6983. The results, A and B, are cycled through timing latches 186 and 194 respectively before entering an ADD 3×8-no-overflow summation block 188 where they are both subtracted from corresponding Y luminance values as such:

GREEN=Y−A−B=Y−[-
(U−128*0.3366]−[(V−128)*0.6983].

Figure 21:
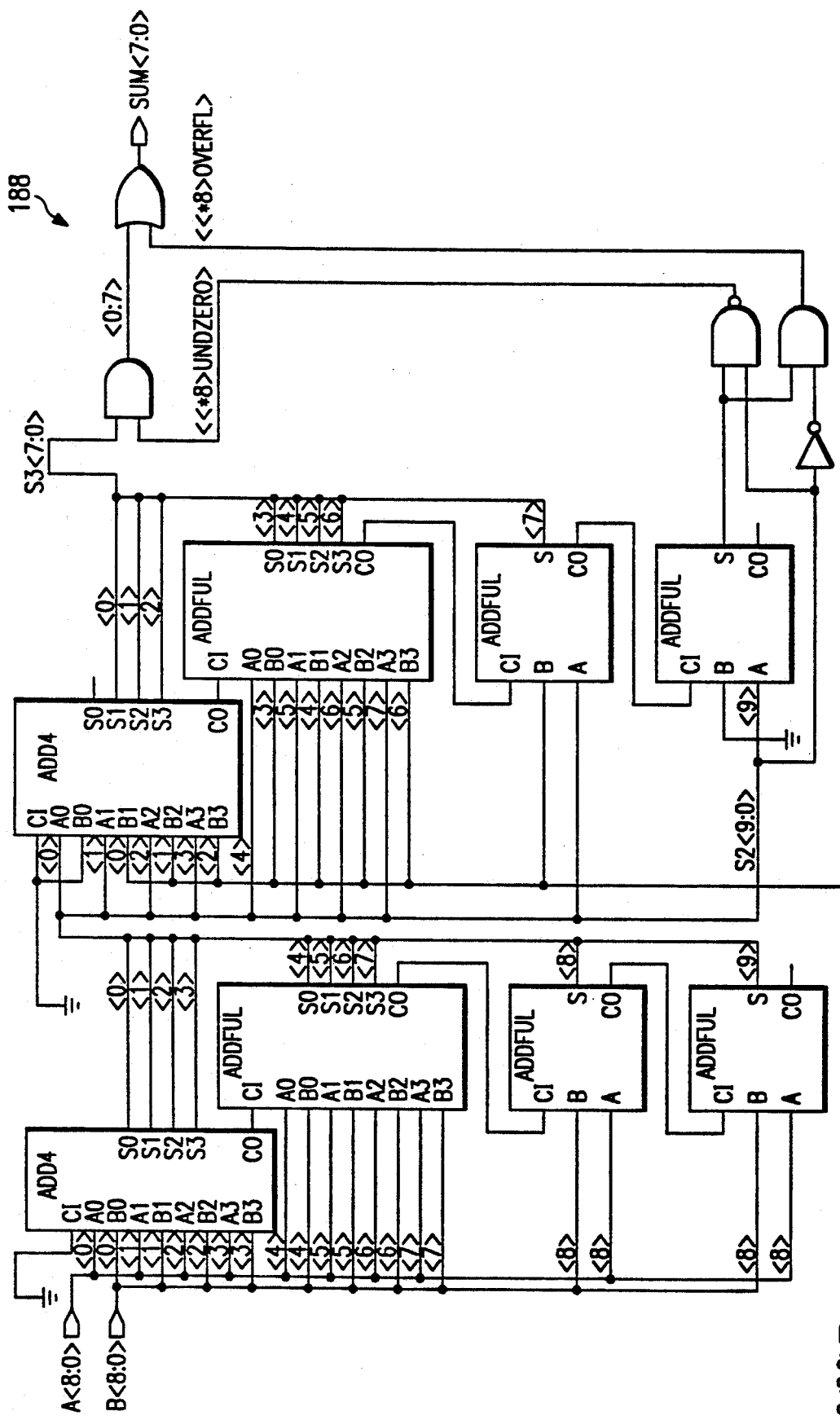
FIG. 21 is a schematic diagram of an add-3-by-8-no-overflow circuit utilized within the YUV-to-RGB converter of FIG. 20.
Figure 22:
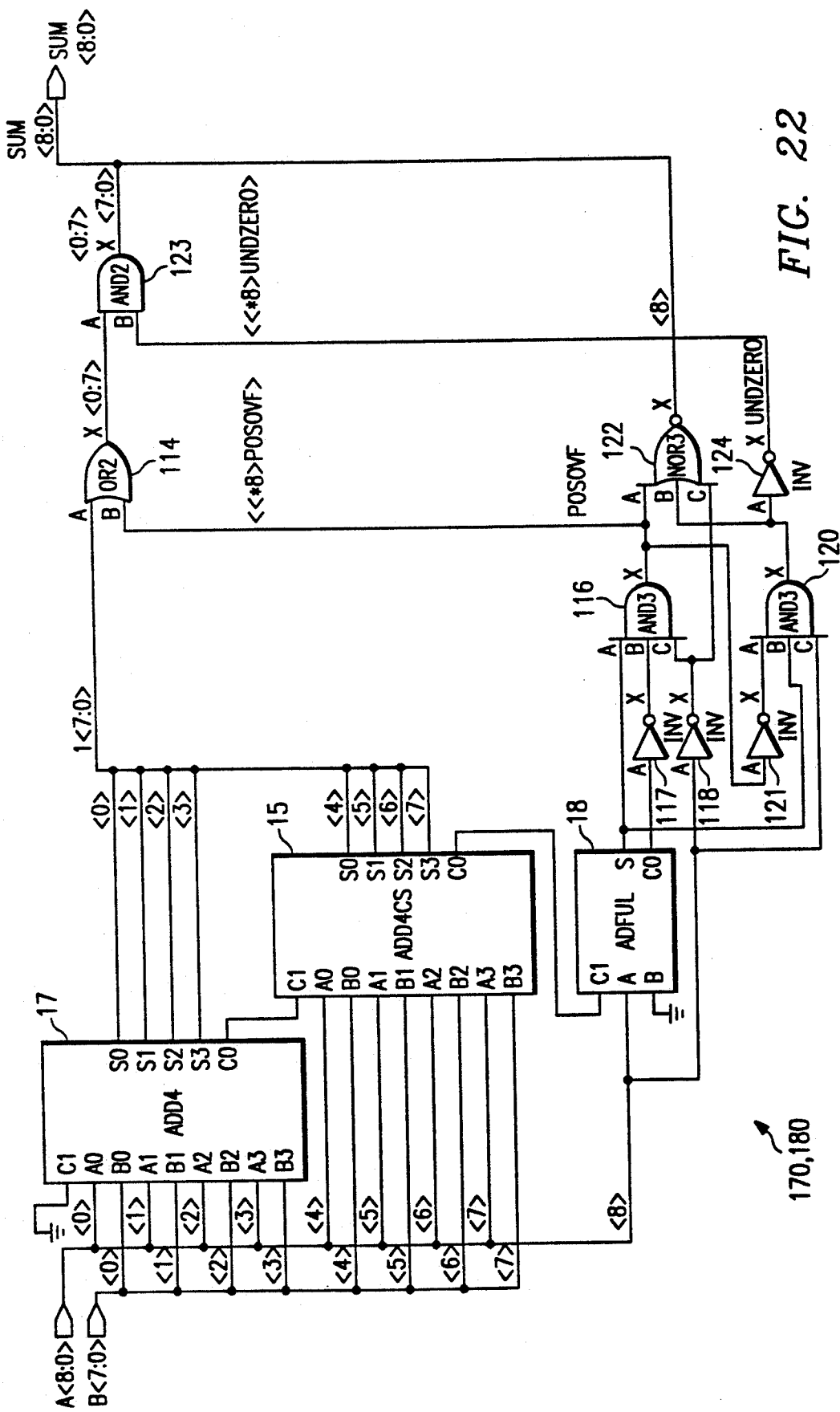
FIG. 22 is a schematic diagram of an add-2-by-8-no-overflow circuit utilized within the YUV-to-RGB converter of FIG. 20.

The ADD 3×8-no-overflow summation block is further detailed in FIG. 21. The resulting 8 bit GREEN components are cycled through a timing latch 190 before exiting the YUV-to-RGB converter 20.

Figure 19B:
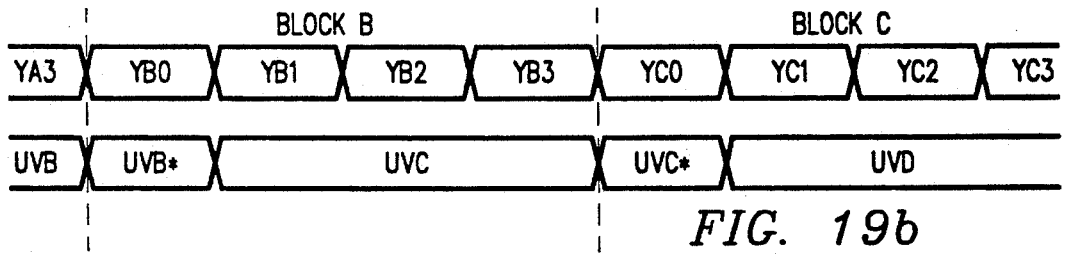
FIG. 19b is a timing diagram by which the YUV-8 decoder of FIG. 2a interpolates data in transition state 0.
Figure 19C:
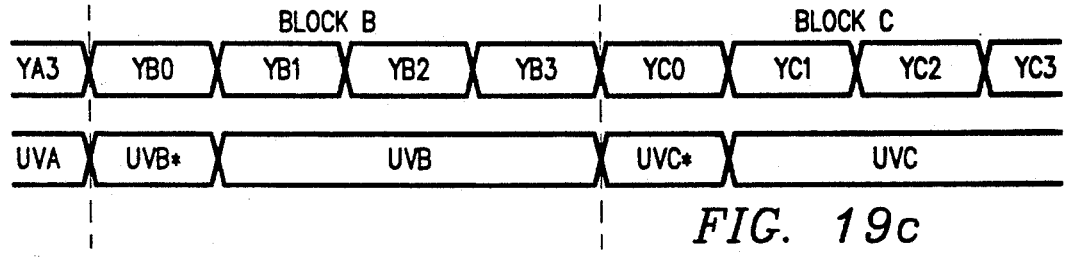
FIG. 19c is an alternate timing diagram by which the YUV-8 decoder of FIG. 2a may interpolate data in transition state 0.
Figure 19D:
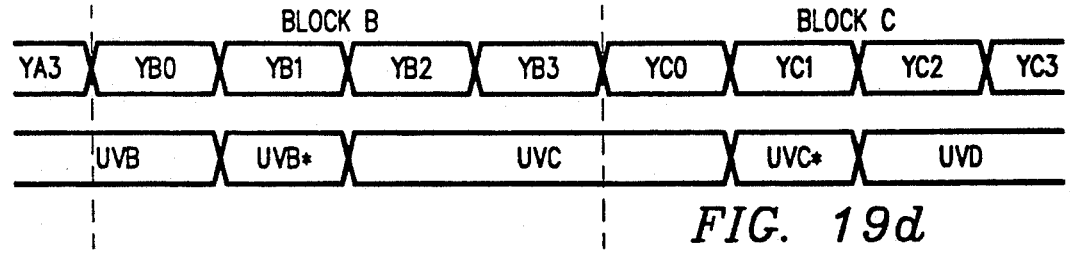
FIG. 19d is timing diagram by which the delta YUV decoder of FIG. 2a interpolates data in transition state 1.
Figure 19E:
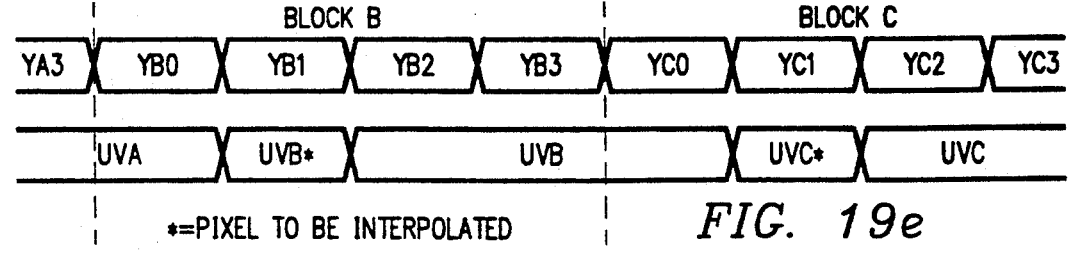
FIG. 19e is an alternate timing diagram by which the delta YUV decoder of FIG. 2a may interpolate data in transition state 1.

Referring next to FIG. 19b-e, an alternate embodiment of the delta YUV decoder 18b in which the U and V components used for interpolation purposes has been modified. FIG. 19b is a timing diagram which illustrates the U and V components selected for interpolation in accordance with the embodiment of the delta YUV decoder 18b illustrated in FIGS. 5–19a and 20–22 when the position code, transl, is 0. As may now be seen, the interpolated values UB*, VB* for the color transition are substituted at falling edge of the U, V values. As illustrated in FIG. 19c, in the alternate embodiment, the timing circuitry of the delta YUV decoder 18b should be modified so that the interpolated values UB*, VB* for a color transition are substituted at the leading edge of the U, V values. Similarly, FIG. 19c is a timing diagram which illustrates the U and V components selected for interpolation in accordance with the embodiment of the delta YUV decoder 18b illustrated in FIGS. 5–19a and 20–22 when the position code, transl, is 1. Again, the interpolated values UB*, VB* are substituted on the falling edge of UB, VB. In FIG. 19e, in the alternate embodiment of the delta YUV decoder 18b, the interpolated values UB*, VB* are substituted on the rising edge of UB, VB. Interpolation timing diagrams for transl=2, transl=3 will depart from the teachings of the embodiment of the delta YUV decoder 18b illustrated in FIGS. 5–19a and 20–22 in a similar fashion.

Returning now to FIGS. 2a-c, if bits D(2:0)=(0,1,0), the mode detector circuit 26d propagates a color repeat mode enable signal to the multiplexer 24, thereby supporting a 15 auto color-repeat format designed for cartoon-type animation. When enabled in this manner, the multiplexer 24 will select the PEL data to be propagated to the 8×18 Palette RAM 16 which operates as a color look-up table (or "CLUT"n) where the encoded video data is converted to 6-bit red, green and blue components.

The color repeat decoder 18c decodes the PEL data that had been compressed by color repeat encoding each PEL with four bits. The four bits provide a color-loop-up-table (or "CLUT") address to the palette RAM 16. Each non-zero pixel value is latched simultaneously while being presented to the CLUT. If all four bits of a pixel are zero, then the previous non-zero latched color value is sent to the CLUT. So long as the pixel value equals zero, the previously latched non-zero value is repeated until a new non-zero value is given.

More specifically, and referring now to FIG. 3, incoming pixel data (DAT 7-0), comprised of an upper nibble which provides bank select bits for the palette RAM 16 and a lower nibble which encodes a pixel element in four bits, input from the VGA controller 17 is split so that the upper nibble bypasses the color repeat decoder 18c. Bits 0 through 3 are latched into 4-bit latch 30 by the signal Lat 0, which is designed to clock the latch 30 on any cycle in which non-zero data is presented. When the lower four bits of data equal zero, four-input OR gate 32 will respond and will be latched into flip-flop 34, whose inversed output will be added to the inversed output of flip-flop 38 by an adder 36. If the lower four bits of data do equate to zero, then the adder 36 will produce an output to flip-flop 38, causing the output of flip-flop 38, Lat 0, to not toggle latch 30, thus holding the existing data in latch 30. The timing diagram in FIG. 4 illustrates this process.

Alternately, the PEL data input to the palette RAM 16 may be encoded in 8-bits of data per pixel. In this embodiment, the 8-bits of data would provide an 8-bit CLUT address for the palette RAM 16 where the encoded video data would be converted into 6-bit red, green and blue components. In this manner, the operation of the multiple extended mode palette 10 as a 256 color CLUT would be supported.

If bit D4 is set to 0 and bits D2:0 are other than (0,1,1) or (1,0,0), the multiple extended mode palette 10 is to operate in the industry standard 555 compressed RGB type encoded mode. Accordingly, the mode detector circuit 26d will drive the 555 mode enable line high, thereby instructing the direct color converter 18d to support this 32,768 color mode. In 555 mode, each pixel is represented by two bytes, each containing 5 bits of red, green and blue color intensity configured in the following format:

TABLE 8

| ONE PIXEL | | | | | | | | | | | | | | | | |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | Field Bit Pos |
| X | 4 | 3 | 2 | 1 | 0 | 4 | 3 | 2 | 1 | 0 | 4 | 3 | 2 | 1 | 0 | Color Bit Pos |
| | Red Level | | | | | Green Level | | | | | Blue Level | | | | | |

The input sequence for each pixel is low byte first, followed by high byte. The first low byte will be taken on the first rising edge of CLOCK occurring when BLANK has gone inactive. All subsequent bytes are clocked in on the rising edge of CLOCK.

If bit D4 is 1 when bits D2:0 are other than (0,1,1) and (0,1,1), the mode detector circuit 26d drives the mix mode enable line high, thereby instructing the multiple extended mode palette 10 to selectively support either the 555 or the normal mode. More specifically, the mix mode enable signal is propagated to the direct color converter 18d where it instructs the direct color converter to support 555 mix mode. In 555 mix mode, however, bit 15 of the pixel data input the direct color converter 18d is latched and propagated to a multiplexer controller circuit 26f and multiplexer 24. Bit 15 of the pixel data is used to determine whether the multiple extended mode palette 10 is to operate in 555 or normal mode. If PEL 15 is 0, the direct color converter 18d remains enabled and the multiplexer 24 remains disabled, thereby selecting 555 mode. If, however, PEL 15 is 1, the direct color converter will instruct the multiplexer 24 to begin operation in normal mode in the manner previously set forth, thereby selecting normal mode.

The format for pixel data in mix mode is as follows:

TABLE 8

| ONE PIXEL | | | | | | | | | | | | | | | | |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | Field Bit Pos |
| 0 | 4 | 3 | 2 | 1 | 0 | 4 | 3 | 2 | 1 | 0 | 4 | 3 | 2 | 1 | 0 | Color Bit Pos |
| 555 | Red Level | | | | | Green Level | | | | | Blue Level | | | | | |
| 15 | 14 | 13 | 12 | 11 | 10 | 9 | 8 | 7 | 6 | 5 | 4 | 3 | 2 | 1 | 0 | Field Bit Pos |
| 1 | X | X | X | X | X | X | X | 7 | 6 | 5 | 4 | 3 | 2 | 1 | 0 | Color Bit Pos |
| LUT | | Ignored | | | | | | | DAC look-up table input | | | | | | | |

Continuing to refer to FIG. 2a, the output of the palette RAM 16, the YUV converter 20 and the direct converter 18d are provided as first (00), second (01) and third (10) inputs to multiplexer 28. Multiplexer controller circuit 26 selects which of the three inputs are to be propagated to digital-to-analog converter 12 using the mode enable signals output by the mode detector circuit 26d. Specifically, if either the Sierra 565, Sierra 555, 555, 565, or 888 mode enable signals are active or the mix mode enable signal is active but PEL bit 15 is inactive, the multiplexer controller circuit 26f will instruct the multiplexer 28 to select input 10. If either the YUV-8 or YUV-16 mode enable signals are active, the multiplexer controller circuit 26f will instruct the multiplexer 28 to select input 01. Finally, if either the normal palette or color repeat mode enable signals are active or if the mix mode enable is active and PEL bit 15 is active, the multiplexer controller circuit 26f will instruct the multiplexer 28 to select input 00.

Finally, input VGA to the mode detector circuit 26d and the multiplexer controller circuit 26f provides an override feature which, when driven high, overrides the extended mode type stored in the hidden register 26a and instructs the mode detector circuit 26d and multiplexer controller circuit 26f to switch the multiple extended mode palette 10 into normal mode by instructing the mode detector circuit 26d and multiplexer controller circuit 26f to enable the normal palette mode enable signal and the 00 input to the multiplexer 28, respectively.

The red, green and blue 8 bit pixel data from either the direct color converter 18d, YUV-to-RGB converter 20 or from the 8×18 palette RAM 16 which is selected by the multiplexer controller 26f propagates through the multiplexer 28 and enters the digital-to-analog converter 12 to be converted to analog video pixel signals.

Thus, there has been described and illustrated herein a multimedia systems having a extremely versatile palette capable of supporting multiple extended modes of video data for display. Those skilled in the art, however, will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation of the scope of the invention.

What is claimed is:

1. A multimedia system, comprising:
   a system bus;
   a palette connected to said system bus, said palette configured to receive video data encoded in at least a first mode wherein said video data is encoded as a YUV type video signal, a second mode wherein said video data is encoded as an RGB type video signal and a third mode wherein said video data is encoded as a color look-up table address and having means for converting each of said received modes of encoded video data into an RGB type video signal and an output for transmitting said converted RGB type video signals;
   a VGA controller connected to said system bus, said VGA controller transmitting, via said bus, encoded video data to said palette; and
   display means having an input connected to said palette output, said display means generating a video image from said RGB type video signals received from said palette.

2. A multimedia system according to claim 1 wherein said means for converting each of said received modes of encoded video data into an RGB type video signal further comprises means for converting video data encoded into a five bit luminance component for each of four successive pixel elements, a first five bit chrominance component for said four successive pixel elements and a second five bit chrominance component for said four successive pixel elements into eight bit red, green and blue components for each of said four pixel elements.

3. A multimedia system according to claim 1 wherein said means for converting each of said received modes of encoded video data into an RGB type video signal further comprises means for converting video data encoded into a eight bit luminance component for each of two successive pixel elements and first and second eight bit luminance components for said two successive pixel elements into eight bit red, green and blue components for each of said four pixel elements.

4. A multimedia system according to claim 1 wherein said means for converting each of said received modes of encoded video data into an RGB type video signal further comprises means for converting video data encoded in four data bits for a pixel element into six bit red, green and blue components for said pixel element.

5. A multimedia system according to claim 1 wherein said means for converting each of said received modes of encoded video data into an RGB type video signal further comprises:
   means for converting video data encoded into a five bit luminance component for each of four successive pixel elements, a first five bit chrominance component for said four successive pixel elements and a second five bit chrominance component for said four successive pixel elements into eight bit red, green and blue components for each of said four pixel elements;
   means for converting video data encoded into an eight bit luminance component for each of two successive pixel elements and first and second eight bit chrominance components for said two successive pixel elements into eight bit red, green and blue components for each of said two pixel elements; and
   means for converting video data encoded in four data bits for a pixel element into six bit red, green and blue components for said pixel element.

6. A multimedia palette according to claim 5 wherein said means for converting each of said received modes of encoded video data into an RGB type video signal further comprises means for converting data encoded in at least one compressed RGB mode into 8 bit red, green and blue components.

7. A multimedia palette according to claim 6 wherein said means for converting data encoded in at least one compressed RGB mode into 8 bit red, green and blue components further comprises means for converting video data encoded into five bit red, green and blue components for a pixel element into eight bit red, green and blue components for said pixel element.

8. A multimedia palette according to claim 7 wherein said means for converting data encoded in at least one compressed RGB mode into 8 bit red, green and blue components further comprises means for converting video data encoded into five bit red and blue components and a six bit green component for a pixel element into eight bit red, green and blue components for said pixel element.

9. A palette for a multimedia system, comprising:
   first decoder means for decoding video data encoded in a first mode into Y, U and V components;
   a second decoder means for decoding video data encoded in a second mode into Y, U and V components;
   a direct color converter means for converting data encoded in at least one encoded RGB mode into red, green and blue components;
   a color look-up RAM for converting video data encoded as an eight bit color look-up table address into six bit red, green and blue components;
   a YUV to RGB converter connected to receive said decoded YUV data from said first and second decoder means; and
   control means for propagating encoded video data input said palette through said first decoder means and said YUV to RGB converter if said data is encoded in said first mode, through said second decoder means and said YUV to RGB converter if said data is encoded in said second mode, through said direct color converter means if said data is encoded in one of said encoded RGB modes and through said color look-up RAM if said data is encoded as en eight bit color look-up table address.

10. A palette according to claim 9 wherein said first decoder means decodes video data encoded into a five bit luminance component for each of four successive pixel elements, a first five bit chrominance component for said four successive pixel elements, a second five bit chrominance component for said four successive pixel elements and a two bit color transition position code.

11. A palette according to claim 10 wherein said second decoder means decodes video data encoded into an eight bit luminance component for each of two successive pixel elements and first and second eight bit chrominance components for said two successive pixel elements.

12. A palette according to claim 9 wherein said direct color converter means is configured to convert data encoded in 555 RGB mode into eight bit red, green and blue components and wherein said palette further comprises control means for enabling said direct color converter to convert 555 RGB mode encoded video data into said eight bit red, green and blue components.

13. A palette according to claim 12 wherein said direct color converter is further configured to convert data encoded in 565 RGB mode into eight bit red, green and blue components and wherein said palette further comprises control means for enabling said direct color converter to convert 565 RGB mode encoded video data into said eight bit red, green and blue components.

14. A palette according to claim 13 wherein said direct color converter is further configured to convert data encoded in 888 RGB mode into eight bit red, green and blue components and wherein said palette further comprises control means for enabling said direct color converter to convert 888 RGB mode encoded video data into said eight bit red, green and blue components.

15. A palette according to claim 9 and further comprising a color repeat decoder having a color look-up RAM for converting video data encoded as a four bit color look-up table address into six bit red, green and blue components and wherein said control means further comprises means for selectively propagating encoded video data input said palette through said color look-up RAM if said data is encoded in four bits per pixel element.

16. A palette according to claim 15 wherein said color repeat decoder further comprises:
latch means for simultaneously latching four bits corresponding to a pixel element; and
means for propagating four bits of data corresponding to a previous pixel element propagated to said color repeat decoder to said color look-up RAM if said four bits corresponding to said pixel element has a value of zero.

17. A palette for a multimedia system, comprising:
decoder means for decoding video data encoded in at least one encoded YUV mode into Y, U and V components;
a YUV to RGB converter connected to receive said decoded YUV data from said decoder means and convert said received YUV data into eight bit red, green and blue components;
direct color converter means for converting data encoded in at least one encoded RGB mode into eight bit red, green and blue components; and
control means for propagating encoded video data input said palette through said decoder means and said YUV to RGB converter if said input data is YUV type encoded video data, through said direct color converter means if said input data is RGB type encoded video data.

18. A palette according to claim 17 and further comprising a color repeat decoder having a color look-up RAM for converting video data encoded as a four bit color look-up table address into six bit red, green and blue components and wherein said control means further comprises means for propagating encoded video data input said palette through said color look-up RAM if said data is encoded in four bits per pixel element.

19. A palette according to claim 18 and further comprising:
a digital-to-analog converter connected to receive said red, green and blue components from said direct color converter, said YUV to RGB converter and said color look-up RAM, respectively; and
second control means for selectively propagating red, green and blue components from said direct color converter, said YUV to RGB converter and said color look-up RAM to said digital-to-analog converter;
wherein said digital-to-analog converter converts said received red, green and blue components into an analog video signal to be output said palette for display.

20. A palette according to claim 19 wherein said decoder means further comprises means for decoding video data encoded into a five bit luminance component for each of four successive pixel elements, a first five bit chrominance component for said four successive pixel elements and a second five bit chrominance component for said four successive pixel elements and a two bit color transition position code.

21. A palette according to claim 20 wherein said decoder means further comprises means for decoding video data encoded into an eight bit luminance component for each of two successive pixel elements and first and second eight bit luminance components for said two successive pixel elements.

22. A palette according to claim 21 wherein said direct color converter means further comprises means for converting data encoded in 555 mode into said eight bit red, green and blue components.

23. A palette according to claim 22 wherein said direct color converter means further comprises means for converting data encoded in 565 mode into said eight bit red, green and blue components.

24. A palette according to claim 23 wherein said direct color converter means further comprises means for converting data encoded in 888 mode into said eight bit red, green and blue components.

* * * * *

UNITED STATES PATENT AND TRADEMARK OFFICE
CERTIFICATE OF CORRECTION

PATENT NO. : 5,258,826

DATED : November 2, 1993

INVENTOR(S) : Carl K. Wakeland and Dale Chatham

It is certified that error appears in the above-identified patent and that said Letters Patent is hereby corrected as shown below:

Col. 13, line 9, "Bits and 6" should read --Bits 5 and 6--

Col. 15, line 20, "flip-flop flop 106" should read --flip-flop 106--

Col. 20, line 51, "(or "CLUT"n)" should read --(or "CLUT")

Col. 24, line 50, claim 9, "as en" should read --as an--.

Signed and Sealed this

Twenty-fourth Day of May, 1994

Attest:

BRUCE LEHMAN

*Attesting Officer*          *Commissioner of Patents and Trademarks*